(12) United States Patent
Pu et al.

(10) Patent No.: US 12,530,316 B2
(45) Date of Patent: Jan. 20, 2026

(54) DATA MANAGEMENT METHOD AND CORRESPONDING DEVICE

(71) Applicant: HUAWEI TECHNOLOGIES CO., LTD., Guangdong (CN)

(72) Inventors: Fuan Pu, Shenzhen (CN); Ran Liu, Shenzhen (CN); Shaoliang He, Shenzhen (CN); Guohuai Li, Shenzhen (CN); Haidong Song, Shenzhen (CN); Weilu Li, Guangdong (CN); Xinjian Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/924,173

(22) Filed: Oct. 23, 2024

(65) Prior Publication Data

US 2025/0045245 A1 Feb. 6, 2025

Related U.S. Application Data

(63) Continuation of application No. PCT/CN2023/103675, filed on Jun. 29, 2023.

(30) Foreign Application Priority Data

Aug. 26, 2022 (CN) .......................... 202211032724.5

(51) Int. Cl.
*G06F 16/14* (2019.01)
*G06F 16/178* (2019.01)
*G06F 16/182* (2019.01)

(52) U.S. Cl.
CPC .......... *G06F 16/148* (2019.01); *G06F 16/178* (2019.01); *G06F 16/1824* (2019.01)

(58) Field of Classification Search
CPC .......... G06F 16/13; G06F 16/14; G06F 16/16; G06F 16/168; G06F 16/172;
(Continued)

(56) References Cited

U.S. PATENT DOCUMENTS

| 2008/0025182 | A1* | 1/2008 | Seo ...................... G11B 27/105 707/999.102 |
| 2012/0254215 | A1 | 10/2012 | Miyata |

(Continued)

FOREIGN PATENT DOCUMENTS

| CN | 111782387 A | 10/2020 |
| GB | 2442285 A | 4/2008 |

OTHER PUBLICATIONS

Extended European Search Report in European Appln. No. 23856279.7, mailed on May 8, 2025, 6 pages.

*Primary Examiner* — Shahid A Alam
(74) *Attorney, Agent, or Firm* — Fish & Richardson P.C.

(57) ABSTRACT

This application discloses example data management methods. One example method includes obtaining, by a first terminal device, metadata of a target file in response to an access operation performed by a user on the target file through a first application, where the target file is stored in a local storage device, the first application is different from a second application, the second application is a dedicated application that is of the local storage device and that is installed on the first terminal device, and the first terminal device stores the metadata of the target file. The first terminal device sends an access request to the local storage device, where the access request includes the metadata of the target file. The first terminal device receives the target file sent by the local storage device.

18 Claims, 16 Drawing Sheets

(58) Field of Classification Search
CPC .. G06F 16/178; G06F 16/182; G06F 16/1824; G06F 16/1827
USPC .......................................................... 707/822
See application file for complete search history.

(56) References Cited

U.S. PATENT DOCUMENTS

| | | | |
|---|---|---|---|
| 2013/0304706 A1* | 11/2013 | MacInnis | G06F 16/182 |
| | | | 707/658 |
| 2017/0147601 A1* | 5/2017 | Kaushik | G06F 16/178 |
| 2020/0134053 A1* | 4/2020 | Bhutani | G06F 16/1844 |
| 2021/0303170 A1* | 9/2021 | Lin | G06F 3/0647 |
| 2023/0195695 A1* | 6/2023 | Chen | G06F 16/178 |
| | | | 707/626 |

* cited by examiner

DATA MANAGEMENT METHOD AND CORRESPONDING DEVICE

CROSS-REFERENCE TO RELATED APPLICATIONS

This application is a continuation of International Application No. PCT/CN2023/103675, filed on Jun. 29, 2023, which claims priority to Chinese Patent Application No. 202211032724.5, filed on Aug. 26, 2022. The disclosures of the aforementioned applications are hereby incorporated by reference in their entireties.

TECHNICAL FIELD

This application relates to the field of storage technologies, and specifically, to a data management method and a corresponding device.

BACKGROUND

With popularization of mobile terminals (such as a mobile phone and a tablet), limited storage space of the mobile terminals cannot meet an increasing requirement of a user for storage space. Many user devices encounter a problem of insufficient storage space after being used for two years.

To alleviate this problem, some users use cloud storage (cloud disk) to back up data. However, because costs of the cloud storage are high, a rate is often limited by an operator, privacy leakage occurs, and the like, a network attached storage (NAS) device emerges in the market. Because the NAS device has large capacity and good privacy, and is a private device of the user, a storage requirement of the user can be better met.

However, data stored in a current NAS device can be accessed by the user only through a dedicated NAS application (app) on the mobile terminal, resulting in extremely inconvenient data access.

SUMMARY

This application provides a data management method, to improve flexibility of data access on a local storage device. This application further provides a corresponding device, system, computer-readable storage medium, computer program product, and the like.

A first aspect of this application provides a data management method, including: A first terminal device obtains metadata of a target file in response to an access operation performed by a user on the target file through a first application, where the target file is stored in a local storage device, the first application is different from a second application, the second application is a dedicated application that is of the local storage device and that is installed on the first terminal device, and the first terminal device stores the metadata of the file stored in the local storage device. The first terminal device sends an access request to the local storage device, where the access request includes the metadata. The first terminal device receives the target file sent by the local storage device.

In this application, the first terminal device may be a device on which an application (app) can be installed, for example, a mobile phone, a tablet computer, a notebook computer, a personal computer, a smart television, or smart wearable. The local storage device may be an independent device having a storage function, for example, a network attached storage (NAS) device.

In this application, the first application may be an application that can directly or indirectly access the local storage device, for example, may be a system album management application, a file management application, or a third-party application. The second application is a dedicated application of the local storage device. The first application may be used to access a file in the local storage device, insert a file into the local storage device, modify a file in the local storage device, or delete a file in the local storage device. The second application may be used to establish an initial connection between the first terminal device and the local storage device, to configure the first terminal device under a corresponding account recorded in the local storage device. Certainly, the second application may also be used to manage a file in the local storage device, for example, perform management operations such as addition, deletion, modification, or query. Alternatively, the second application may be used to manage the local storage device. For example, the second application is used to shut down or restart the local storage device, and the second application is used to share the file to a terminal device of another family member.

In this application, the metadata may be an index of a file or other information that can uniquely identify the file. The file in this application may be data of various types such as a picture, a video, audio, and a document.

In this application, because the first terminal device stores the metadata of the file stored in the local storage device, when the user needs to search, through the first application, for the target file stored in the local storage device, the first terminal device may search for the target file from the local storage device based on the metadata of the target file, and may query the file in the local storage device without using the second application dedicated to the local storage device, thereby improving flexibility of using the local storage device.

In a possible implementation, the first terminal device includes an application layer, a framework service layer, and a storage layer. The first application and the second application are configured at the application layer. A distributed file is configured at the storage layer, and the distributed file provides the application layer with a capability of accessing the file of the local storage device. An application invoking interface, a metadata management module, and a synchronization module are configured at the framework service layer. The application invoking interface is an entry for the first application to enter the framework service layer, and is configured to invoke the metadata management module. The metadata management module is configured to manage the metadata of the file stored in the local storage device. The synchronization module is logically connected to the distributed file and performs file transfer with the local storage device.

In this possible implementation, the first application invokes the application invoking interface to enter the framework service layer, and then data transmission between the first terminal device and the local storage device may be implemented via the metadata management module, the distributed file, and the synchronization module. In a case in which the user is unaware of the data transmission, communication between the first terminal device and the local storage device is implemented through the first application.

In a possible implementation, a local file is further configured at the storage layer, and the local file stores a file generated by the first terminal device. The metadata management module is further configured to manage metadata of the file stored in the local file.

In this possible implementation, the metadata management module may manage the file in the local file, and may also manage the data in the local storage device, thereby implementing unified management on the data in the first terminal device and the file in the local storage device.

In a possible implementation, the framework service layer includes a file buffer, and the file buffer is configured to buffer the target file or thumbnail information of the target file within a preset time period starting from a generation time of the target file.

In this possible implementation, if the file is a picture, the thumbnail information may be a thumbnail. A file newly generated or recently accessed by the user and thumbnail information of the file within a similar time period are buffered in the file buffer, so that a network delay and frame freezing can be avoided, and user experience can be improved.

In a possible implementation, first metadata in the metadata management module includes identification information, the first metadata is metadata of a first file, and the identification information indicates that the first file is stored in both the first terminal device and the local storage device.

In this possible implementation, when the first file is stored in both the first terminal device and the local storage device, one piece of metadata may be used to manage the first file stored in the two places, and a corresponding indication may be made only by adding identification information to the first metadata. This metadata convergence management manner can reduce redundancy of the metadata.

In a possible implementation, the first terminal device manages the first file in the first terminal device based on the identification information included in the first metadata in response to a management operation performed by the user on the first file, and sends a corresponding operation instruction for the first file to the local storage device, where the operation instruction is used by the local storage device to manage the first file stored in the local storage device.

In this possible implementation, for the first file that is stored in both the first terminal device and the local storage device, when the user needs to operate the first file, the user may manage, according to an operation instruction, the first file stored in the first terminal device and the local storage device. In this way, inconsistency of a plurality of copies of the first file can be avoided, and management accuracy of a same file is improved.

In a possible implementation, the first terminal device receives metadata of a changed file in the local storage device from the local storage device, where the changed file in the local storage device includes at least one of the following: a file newly generated by a second terminal device, a file that is in the local storage device and that is modified by the second terminal device, or a file that is in the local storage device and that is deleted by the second terminal device, and the second terminal device and the first terminal device are associated with a same registered account in the local storage device. The first terminal device synchronously updates, based on the metadata of the changed file and a change indication, metadata stored in the first terminal device.

In this possible implementation, for a file generated or a file modified by another terminal under a same registered account, after the file is synchronized to the local storage device, the local storage device may synchronize corresponding metadata to the first terminal device, so that data synchronization between terminal devices under the same registered account can be maintained.

In a possible implementation, the method further includes: The first terminal device sends changed data in the first terminal device to the local storage device, where the changed data in the first terminal device includes at least one of the following: metadata of a file newly generated by the first terminal device and the newly generated file, metadata of a file that is in the local storage device and that is modified by the first terminal device and a modified file, or metadata of a file that is in the local storage device and that is deleted by the first terminal device. The changed file is used by the local storage device to synchronously update the file and/or metadata stored in the local storage device.

In this possible implementation, the file newly generated by the first terminal device or the file modified or deleted by the first terminal device is also synchronized to the local storage device, and the local storage device may also synchronize metadata of the changed data of the first terminal device to another terminal device, so that data synchronization between terminal devices under the same registered account can be maintained.

In a possible implementation, the method further includes: The first terminal device deletes a second file from the local file of the first terminal device in response to a delete operation performed by the user on the second file, where the second file has already been stored in the local storage device.

In this possible implementation, the file that has been stored in the local storage device may be deleted from the local file, to release local storage space, and experience of accessing the file by the user through the first application is not affected.

In a possible implementation, the method further includes: The first terminal device receives an analysis result from the local storage device, where the analysis result is obtained by the local storage device by analyzing the file in the local storage device.

In this possible implementation, because the local storage device is a private storage device of the user and has a strong computing power, after data of the user is backed up to the local storage device, some automatic analysis may be performed on the local storage device. Based on the analysis result, the data of the user may be mobilized, so that the user can conveniently retrieve and manage the data. In this way, the local storage device not only provides storage space for the terminal device, but also implements computing power support, thereby saving power of the terminal device.

A second aspect of this application provides a data management method, including: A local storage device receives an access request sent by a first terminal device, where the access request is triggered by the first terminal device in response to an access operation performed by a user on a target file through a first application, the target file is stored in the local storage device, the first application is different from a second application, the second application is a dedicated application that is of the local storage device and that is installed on the first terminal device, and the access request includes metadata of the target file. The local storage device searches for the target file based on the access request and the metadata. The local storage device sends the target file to the first terminal device.

In a possible implementation, the method further includes: The local storage device sends metadata of a changed file in the local storage device to the first terminal device, where the changed file in the local storage device includes at least one of the following: a file newly generated by a second terminal device, a file that is in the local storage device and that is modified by the second terminal device, or a file that is in the local storage device and that is deleted by the second terminal device, and the second terminal device and the first terminal device are associated with a same registered account in the local storage device.

In a possible implementation, the method further includes: The local storage device receives changed data that is in the first terminal device and that is sent by the first terminal device, where the changed data in the first terminal device includes at least one of the following: metadata of a file newly generated by the first terminal device and the newly generated file, metadata of a file that is in the local storage device and that is modified by the first terminal device and a modified file, or metadata of a file that is in the local storage device and that is deleted by the first terminal device. The local storage device synchronously updates, based on the changed file, the file and/or metadata stored in the local storage device.

In a possible implementation, the method further includes: The local storage device analyzes the file in the local storage device to obtain an analysis result. The local storage device sends the analysis result to the first terminal device.

A third aspect of this application provides a terminal device, configured to perform the method in the first aspect or any possible implementation of the first aspect. Specifically, a client includes modules or units configured to perform the method in the first aspect or any possible implementation of the first aspect, for example, a processing unit, a sending unit, and a receiving unit.

A fourth aspect of this application provides a local storage device, configured to perform the method in the second aspect or any possible implementation of the second aspect. Specifically, the local storage device includes modules or units configured to perform the method in the second aspect or any possible implementation of the second aspect, for example, a receiving unit, a processing unit, and a sending unit.

A fifth aspect of this application provides a terminal device, including a transceiver, a processor, and a memory. The transceiver and the processor are coupled to the memory, the memory is configured to store a program or instructions, and when the program or the instructions are executed by the processor, the terminal device is enabled to perform the method in the first aspect or any possible implementation of the first aspect.

A sixth aspect of this application provides a local storage device. The local storage device may include at least one processor, a memory, and a communication interface. The processor is coupled to the memory and the communication interface. The memory is configured to store instructions, the processor is configured to execute the instructions, and the communication interface is configured to communicate with another network element under control of the processor. When the instructions are executed by the processor, the processor is enabled to perform the method in the second aspect or any possible implementation of the second aspect.

A seventh aspect of this application provides a chip system. The chip system includes one or more interface circuits and one or more processors. The interface circuit and the processor are interconnected through a line. The interface circuit is configured to: receive a signal from a memory of a terminal device, and send the signal to the processor. The signal includes computer instructions stored in the memory. When the processor executes the computer instructions, the terminal device performs the method in the first aspect or any possible implementation of the first aspect.

An eighth aspect of this application provides a chip system. The chip system includes one or more interface circuits and one or more processors. The interface circuit and the processor are interconnected through a line. The interface circuit is configured to: receive a signal from a memory of a local storage device, and send the signal to the processor. The signal includes computer instructions stored in the memory. When the processor executes the computer instructions, the local storage device performs the method in the second aspect or any possible implementation of the second aspect.

A ninth aspect of this application provides a computer-readable storage medium. The computer-readable storage medium stores a computer program or instructions. When the computer program or the instructions are run on a computer, the computer is enabled to perform the method in the first aspect or any possible implementation of the first aspect.

A tenth aspect of this application provides a computer-readable storage medium. The computer-readable storage medium stores a computer program or instructions. When the computer program or the instructions are run on a computer, the computer is enabled to perform the method in the second aspect or any possible implementation of the second aspect.

An eleventh aspect of this application provides a computer program product. The computer program product includes computer program code. When the computer program code is executed on a computer, the computer is enabled to perform the method in the first aspect or any possible implementation of the first aspect.

A twelfth aspect of this application provides a computer program product. The computer program product includes computer program code. When the computer program code is executed on a computer, the computer is enabled to perform the method in the second aspect or any possible implementation of the second aspect.

A thirteenth aspect of this application provides a data management system. The data management system includes a local storage device and a plurality of terminal devices. A first terminal device in the plurality of terminal devices is configured to perform the method in the first aspect or any possible implementation of the first aspect. The local storage device is configured to perform the method in the second aspect or any possible implementation of the second aspect.

For technical effect brought by the second aspect to the thirteenth aspect or any possible implementation of the second aspect to the thirteenth aspect, refer to the technical effect brought by the first aspect or different possible implementations of the first aspect. Details are not described herein again.

DESCRIPTION OF EMBODIMENTS

The following describes embodiments of this application with reference to the accompanying drawings. It is clear that the described embodiments are merely some rather than all of embodiments of this application. A person of ordinary skill in the art may know that with development of technologies and emergence of new scenarios, the technical solutions provided in embodiments of this application are also applicable to resolving similar technical problems.

In the specification, claims, and accompanying drawings of this application, the terms "first", "second", and so on are intended to distinguish between similar objects but do not necessarily indicate a specific order or sequence. It should be understood that the data termed in such a way are interchangeable in proper circumstances so that embodiments of the present disclosure described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

An embodiment of this application provides a data management method, to improve flexibility of data access on a local storage device. This application further provides a corresponding device, system, computer-readable storage medium, computer program product, and the like. Details are separately described in the following.

Figure 1A:
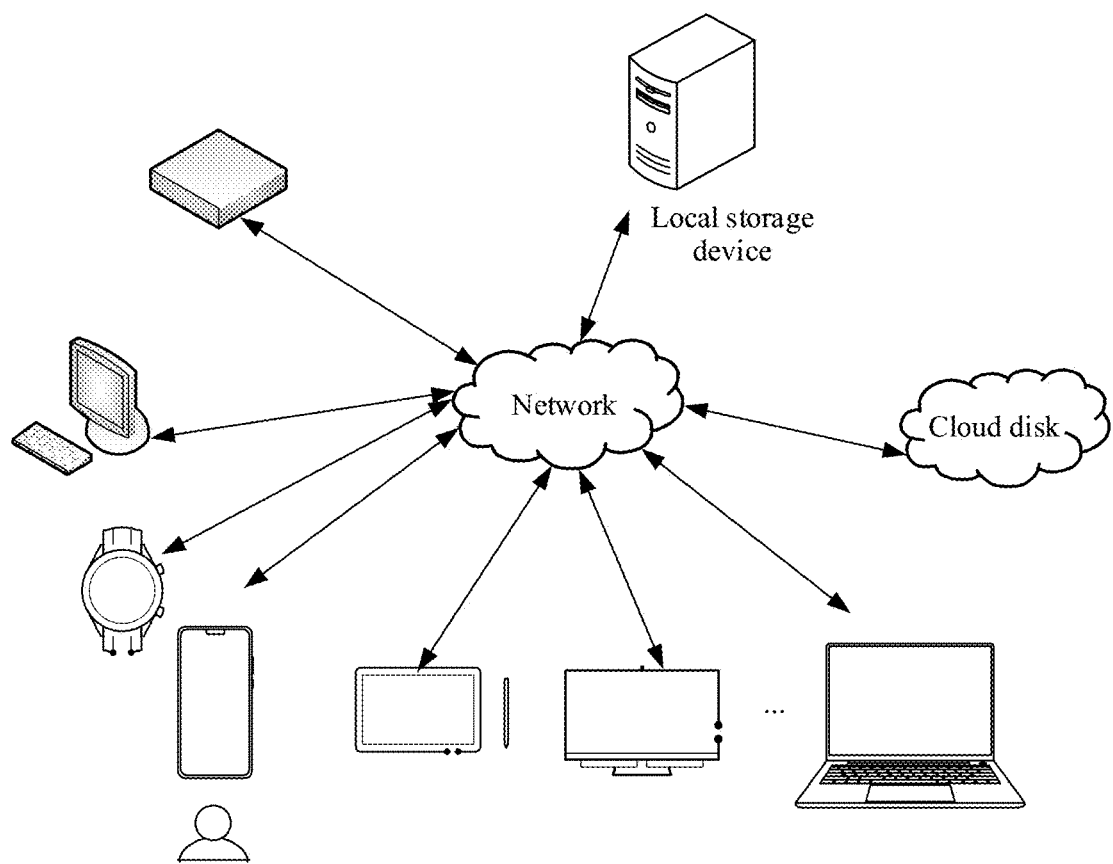
FIG. 1A is a diagram of an architecture of a data management system according to an embodiment of this application.

FIG. 1A is a diagram of an architecture of a data management system according to an embodiment of this application.

As shown in FIG. 1A, the data management system provided in this embodiment of this application includes a local storage device and a plurality of terminal devices. The local storage device may communicate with each terminal device over a network, and the local storage device may further communicate with a cloud disk over a network.

In this embodiment of this application, the local storage device may be a server or a physical machine having a storage function and a specific computing capability. Alternatively, the local storage device may be understood as a network attached storage (NAS) device. The NAS device is a dedicated data storage server, and generally includes hardware, an operating system, a file system on the NAS device, and the like. The NAS device has features such as high capacity, high efficiency, and high reliability.

In this embodiment of this application, local storage is data storage within a specific user range, for example, home storage. Only data of several family members that are pre-registered with the local storage device is stored. The NAS storage device can be mainly used by common consumers. After purchasing, the user places the NAS storage device at home and uses the NAS storage device after being powered on and connected to the network. A plurality of users are supported to share one home storage device to ensure normal use of a family or a specific number of users. Data between users is isolated from each other and is encrypted for storage. Dual backup is supported to ensure data security and privacy of the user to a maximum extent. The local storage device is a private device of the user. In addition to the storage function, the local storage device can perform artificial intelligence (AI) analysis on data of the user, such as face clustering and text recognition. In this way, the local storage device can build a search model to mobilize the data of the user and improve usage experience of the user.

In this embodiment of this application, the plurality of terminal devices may be various types of terminal devices, for example, a mobile phone, a tablet computer, a notebook computer, a personal computer (PC), a hard disk, a mobile internet device (MID), a smart television, smart wearable, a virtual reality (VR) device, an augmented reality (AR) device, a wireless electronic device in industrial control, a wireless electronic device in self driving, a wireless electronic device in remote medical surgery, a wireless terminal device in a smart grid, a wireless terminal device in transportation safety, a wireless terminal device in a smart city, and a wireless terminal device in a smart home. The terminal device may be a device running an Android system, an iOS system, a windows system, and another system. A first terminal device in the plurality of terminal devices may run an application that can access the local storage device, for example, an album management application, a file management application, or a third-party application, and further run a dedicated application of the local storage device. The first terminal device may be any terminal device on which an application can be installed.

FIG. 1A merely shows several examples for description, and should not be understood as a limitation on a type of the terminal device.

Figure 1B:
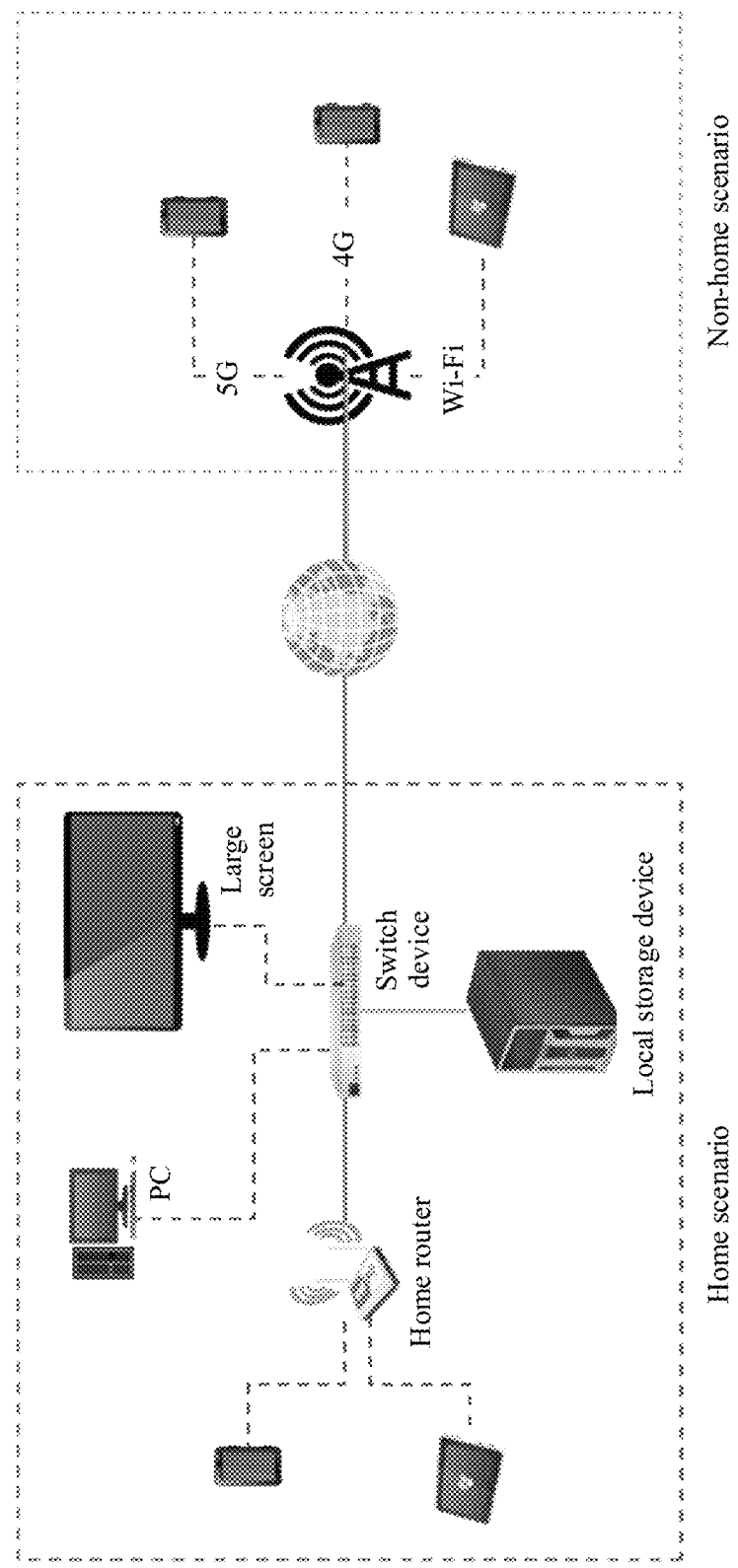
FIG. 1B is a diagram of an architecture of a data management system according to an embodiment of this application.

In FIG. 1A, a communication relationship between a terminal device and a local storage device is expressed in a general network form. Actually, the communication relationship between the terminal device and the local storage device may relate to a home scenario and a non-home scenario. As shown in FIG. 1B, in the home scenario, a terminal device (for example, a mobile phone or a tablet computer) for wireless communication may communicate with a local storage device via a home router and a switch device, and another wired device (PC, large screen (smart television)) in the home can communicate with the local storage device via the switch device. When a user is not at home, that is, in the non-home scenario, a terminal device (for example, a mobile phone or a tablet computer) for wireless communication may communicate with a local storage device via a base station and a core network.

In this embodiment of this application, the cloud disk is a storage resource in a network. In content related to this application, the cloud disk may be understood as a special type of terminal device similar to a hard disk.

Figure 2A:
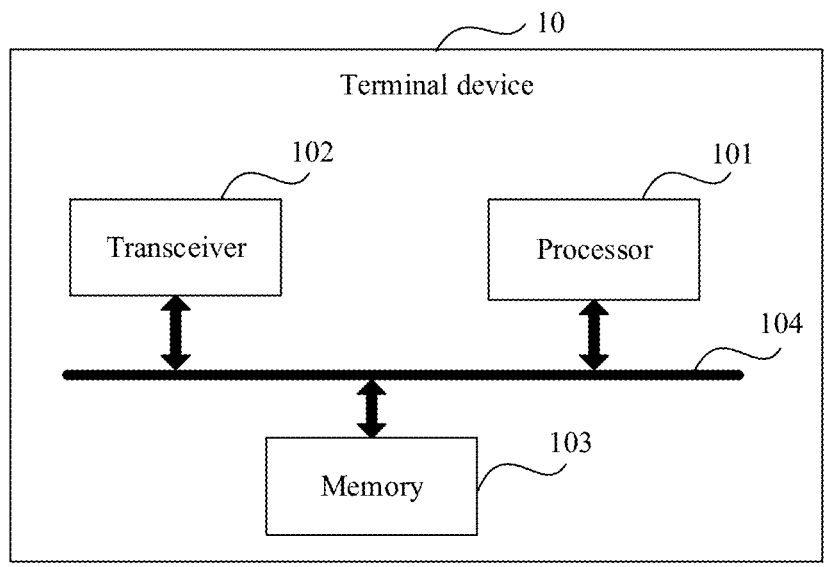
FIG. 2A is a diagram of a structure of a terminal device according to an embodiment of this application.

For a structure of the terminal device provided in this embodiment of this application, refer to FIG. 2A for understanding. For a structure of the local storage device, refer to FIG. 2B for understanding.

FIG. 2A is a diagram of a structure of a terminal device according to an embodiment of this application. As shown in FIG. 2A, the terminal device may include a processor 101, a transceiver 102, a memory 103, and a bus 104. The processor 101, the transceiver 102, and the memory 103 are connected to each other through the bus 104. In this embodiment of this application, the processor 101 is configured to control and manage an action of the terminal device 10. For example, the processor 101 is configured to respond to a user operation, and obtain metadata of a target file. The transceiver 102 is configured to support the terminal device 10 in communication. For example, the transceiver 102 may perform a step of sending an access request or receiving the target file. The memory 103 is configured to store program code and data of the terminal device 10.

The processor 101 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The bus 104 may be a peripheral component interconnect (PCI) bus, an extended industry standard architecture (EISA) bus, or the like. Buses may be classified into an address bus, a data bus, a control bus, and the like. For ease of representation, only one thick line is used for representation in FIG. 2A, but this does not mean that there is only one bus or only one type of bus.

Figure 2B:
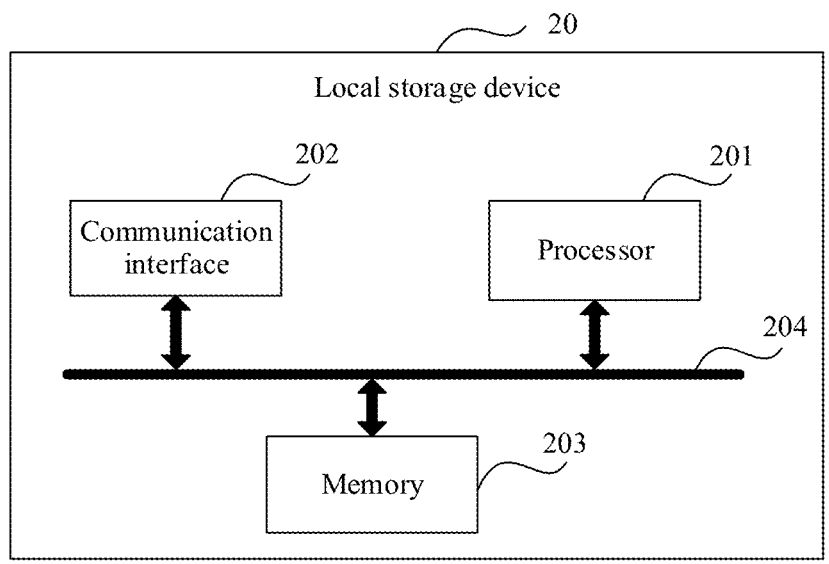
FIG. 2B is a diagram of a structure of a local storage device according to an embodiment of this application.

The foregoing describes the structure of the terminal device in FIG. 2A, and the following describes the structure of the local storage device with reference to FIG. 2B.

FIG. 2B is a diagram of a possible logical structure of a local storage device according to an embodiment of this application. As shown in FIG. 2B, the local storage device 20 provided in this embodiment of this application includes a processor 201, a communication interface 202, a memory 203, and a bus 204. The processor 201, the communication interface 202, and the memory 203 are connected to each other through the bus 204. In this embodiment of this application, the processor 201 is configured to control and manage an action of the local storage device 20. For example, the processor 201 is configured to perform a process of searching for a target file. The communication interface 202 is configured to support the local storage device 20 in communication. For example, the communication interface 202 may perform steps of receiving an access request and sending the target file. The memory 203 is configured to store program code and data of the local storage device 20.

The processor 201 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The bus 204 may be a peripheral component interconnect (PCI) bus, an extended industry standard architecture (EISA) bus, or the like. Buses may be classified into an address bus, a data bus, a control bus, and the like. For ease of representation, only one thick line is used for representation in FIG. 2B, but this does not mean that there is only one bus or only one type of bus.

In this embodiment of this application, any terminal device that can be installed with an application in a plurality of terminal devices may be referred to as a first terminal device, and may perform the following data management process.

Figure 3:
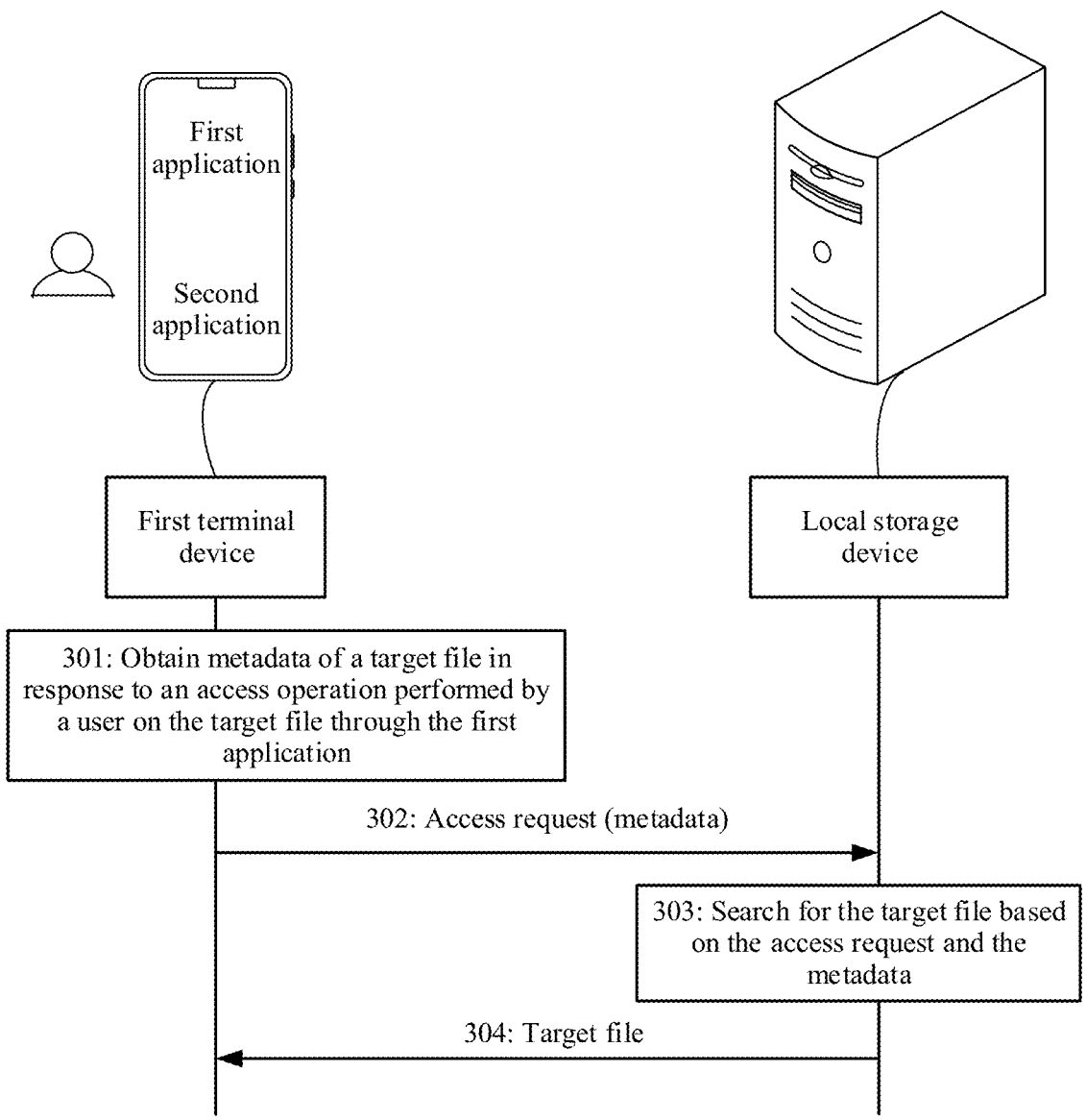
FIG. 3 is a diagram of an embodiment of a data management method according to an embodiment of this application.

As shown in FIG. 3, an embodiment of a data management method provided in an embodiment of this application includes the following steps.

301: A first terminal device obtains metadata of a target file in response to an access operation performed by a user on the target file through a first application.

The target file is stored in a local storage device, the first application is different from a second application, the second application is a dedicated application that is of the local storage device and that is installed on the first terminal device, and the first terminal device stores the metadata of the file stored in the local storage device.

In this embodiment of this application, the first application may be an application that can directly or indirectly access the local storage device, for example, may be a system album management application, a file management application, or a third-party application. The second application is a dedicated application of the local storage device. The first application may be used to access a file in the local storage device, insert a file into the local storage device, modify a file in the local storage device, or delete a file in the local storage device. The second application may be used to establish an initial connection between the first terminal device and the local storage device, to configure the first terminal device under a corresponding account recorded in the local storage device. Certainly, the second application may also be used to manage a file in the local storage device, for example, perform management operations such as addition, deletion, modification, or query. Alternatively, the second application may be used to manage the local storage device. For example, the second application is used to shut down or restart the local storage device, and the second application is used to share the file to a terminal device of another family member.

In this embodiment of this application, the metadata may be an index of a file or other information that can uniquely identify the file. The file may be data of various types such as a picture, a video, audio, and a document.

302: The first terminal device sends an access request to the local storage device. Correspondingly, the local storage device receives the access request.

The access request includes the metadata.

303: The local storage device searches for the target file based on the access request and the metadata.

304: The local storage device sends the target file to the first terminal device. Correspondingly, the first terminal device receives the target file sent by the local storage device.

In this application, because the first terminal device stores the metadata of the file stored in the local storage device, when the user needs to search, through the first application, for the target file stored in the local storage device, the first terminal device may search for the target file from the local storage device based on the metadata of the target file, and may query the file in the local storage device without using the second application dedicated to the local storage device, thereby improving flexibility of using the local storage device.

Figure 4:
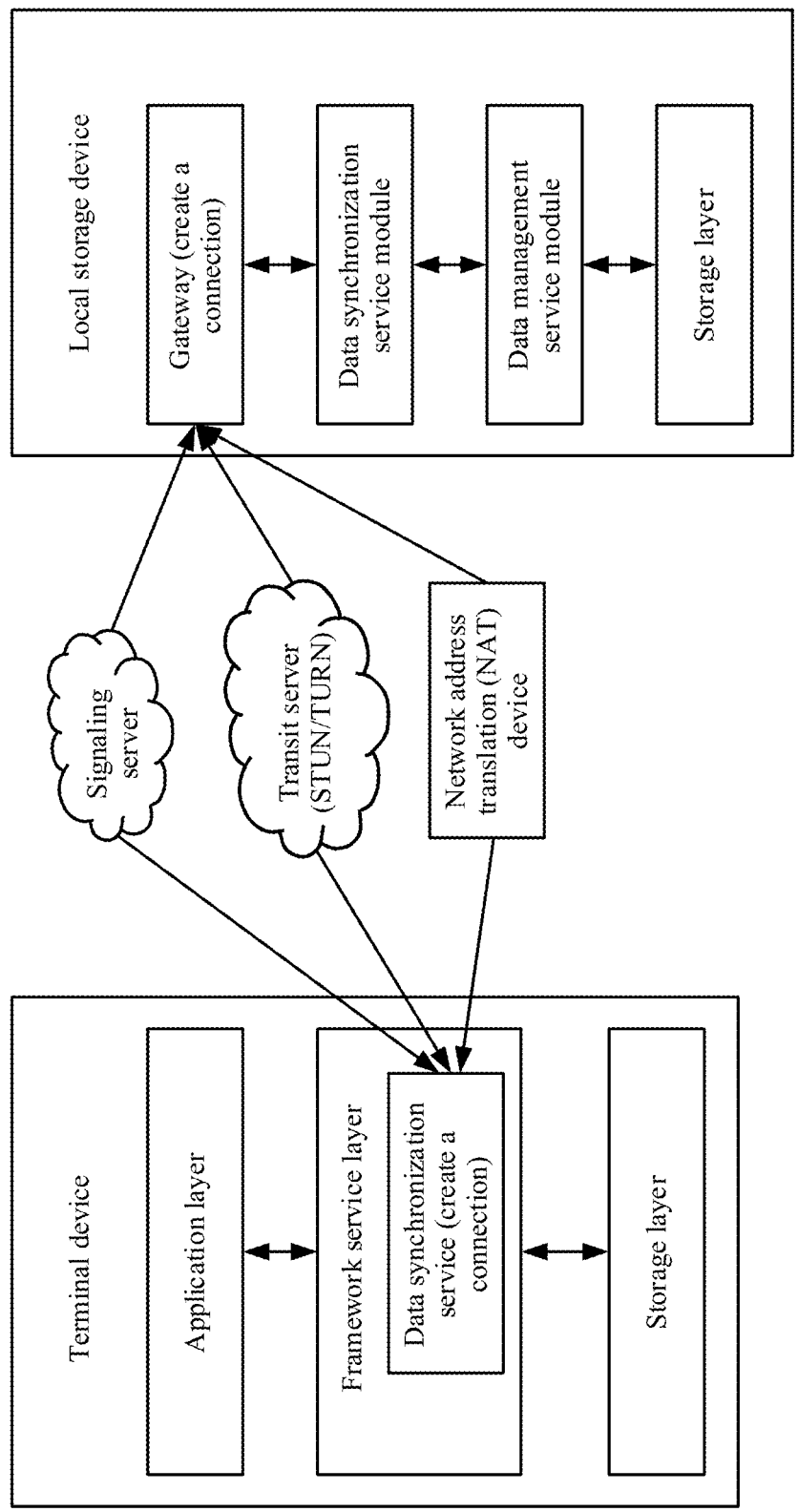
FIG. 4 is a diagram of another architecture of a data management system according to an embodiment of this application.

In this embodiment of this application, the terminal device and the local storage device may be divided into a plurality of layers in an internal structure to implement different functions. As shown in FIG. 4, the terminal device may include an application layer, a framework service layer, and a storage layer. The framework service layer includes a data synchronization service, and is configured to establish a connection to the local storage device. The application layer is used to configure applications, for example, the first application and the second application. The storage layer is used to store data.

The local storage device may include a gateway, a data synchronization service module, a data management service module, and a storage layer. The gateway is configured to establish a connection to the terminal device, and provide a channel for data transmission between the terminal device and the local storage device. The data synchronization service module is configured to interwork with the terminal device and implement data synchronization protocol interaction. The data management service module is configured to perform data management of the local storage device. The storage layer is used for persistent data storage.

A network address translation (NAT) device can be used to translate a network address between the terminal device and the local storage device to implement communication between the terminal device and the local storage device. The terminal device and the local storage device may also communicate with each other via a signaling server (Signal Server) or a transit server ((session traversal utilities NAT, STUN)/(traversal using relays around NAT, TURN)).

Because the local storage device is usually located in a home private network, and generally does not have an independent public IP address, to establish point-to-point communication between home storage and a mobile terminal, the signaling server may be used to coordinate a communication process between the home storage and the mobile terminal, and assist in establishing a data transmission channel. Information about the coordination mainly includes a session control message, failure information, key information, and network information. After the negotiation is completed, the terminal device may attempt to punch a hole, traverse the NAT, and establish a direct communication channel with the local storage device. If the hole fails to be punched, the STURN/TURN needs to be used as the transit server.

Figure 5:
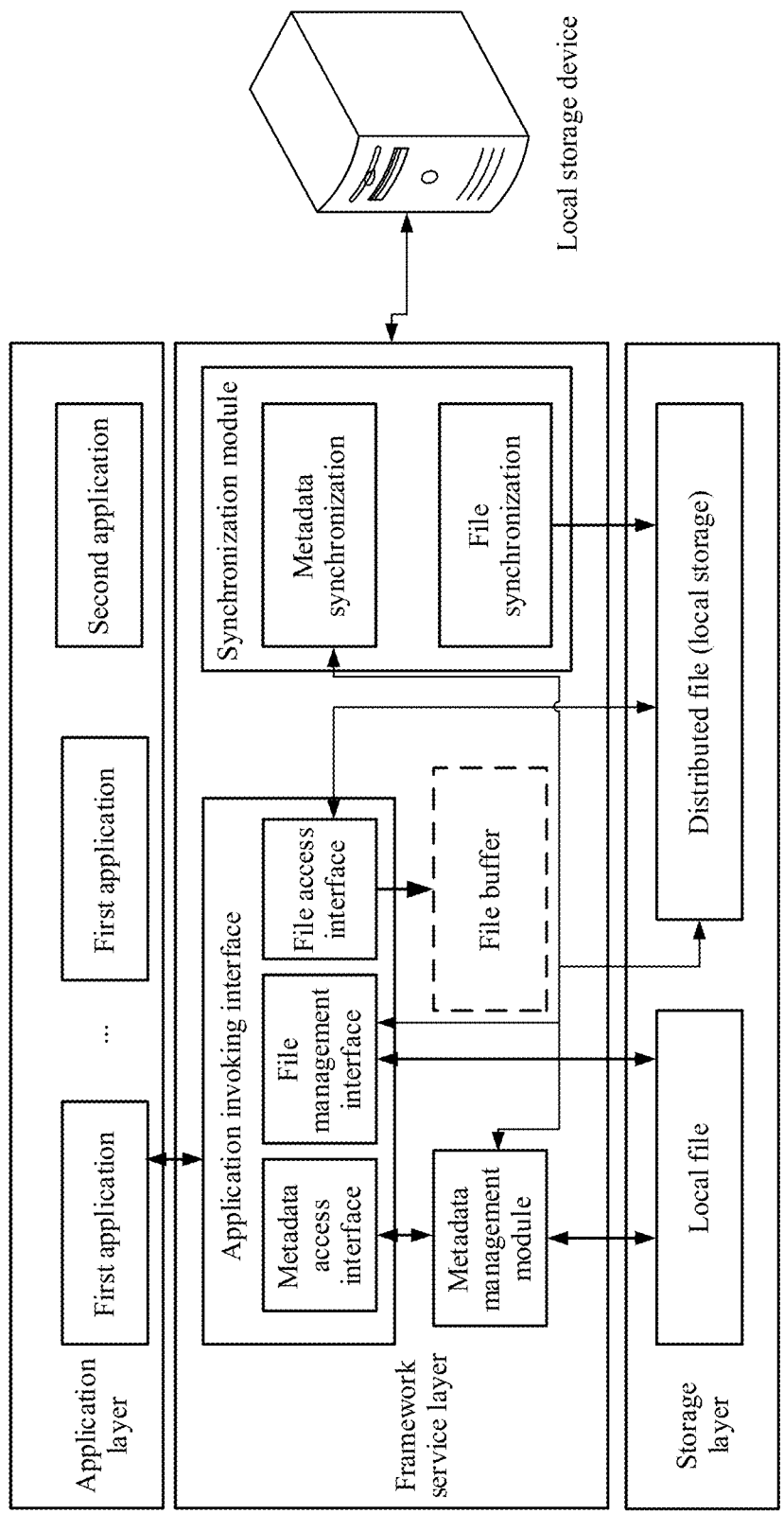
FIG. 5 is a diagram of another architecture of a data management system according to an embodiment of this application.

In this embodiment of this application, as shown in FIG. 5, the first terminal device may include an application layer, a framework service layer, and a storage layer. A first application and a second application are configured at the application layer. A distributed file and a local file are configured at the storage layer. The distributed file provides the application layer with a capability of accessing the local storage device, and the local file stores a file generated by the first terminal device. An application invoking interface, a metadata management module, and a synchronization module are configured at the framework service layer.

The application invoking interface is an entry for the first application to enter the framework service layer. When the user operates the first application, the first terminal device may respond to the user operation, and invoke the application invoking interface through the first application to enter the framework service layer. There may be a plurality of first applications, and each first application may invoke an application invoking interface to enter the framework service layer during running.

The application invoking interface may include a metadata access interface and a file management interface. The metadata access interface is logically connected to the metadata management module, and the metadata management module may be invoked through the metadata access interface. The file management interface is logically connected to the distributed file and the local file, and can be used to manage a file in the local storage device or the local file, for example, operations such as addition, deletion, and modification.

The metadata management module is configured to manage metadata of the file stored in the local storage device and metadata of the file stored in the local file.

The synchronization module may include a metadata synchronization module and a file synchronization module.

The metadata management module may communicate with the metadata synchronization module in the synchronization module, and synchronize the metadata to the local storage device via the metadata synchronization module, or receive the metadata from the local storage device via the metadata synchronization module.

The file synchronization module is logically connected to the distributed file, and may download a file from the local storage device to the distributed file or send a file to the local storage device.

The application invoking interface may further include a file access interface. The file access interface may logically communicate with the distributed file, so that the file downloaded from the local storage device in the distributed file can be accessed.

The framework service layer may further include a file buffer, and the file buffer is configured to buffer the target file or thumbnail information of the target file within a preset time period starting from a generation time of the target file. If the file is a picture, the thumbnail information may be a thumbnail. A file newly generated or recently accessed by the user and thumbnail information of the file within a similar time period are buffered in the file buffer, so that a network delay and frame freezing can be avoided, and user experience can be improved.

The file access interface can logically communicate with the file buffer, so that a new generated file or a recently accessed related file can be quickly accessed.

In this embodiment of this application, the first application invokes the application invoking interface to enter the framework service layer, and then data transmission between the first terminal device and the local storage device may be implemented via the metadata management module, the distributed file, and the synchronization module. In a case in which the user is unaware of the data transmission, communication between the first terminal device and the local storage device is implemented through the first application.

In FIG. 5, the metadata management module may use one piece of metadata to manage a file that is stored in both the first terminal device and the local storage device. To better indicate that specific files are stored in both the first terminal device and the local storage device, identification information may be added to the piece of metadata for implementation. In this way, if first metadata in the metadata management module includes identification information, the first metadata is metadata of a first file, and the identification information indicates that the first file is stored in both the first terminal device and the local storage device.

The metadata convergence management manner provided in this embodiment of this application can reduce redundancy of the metadata.

In this embodiment of this application, for the first file that is stored in both the first terminal device and the local storage device, when the user needs to operate the first file, the user may manage, according to an operation instruction, the first file stored in the first terminal device and the local storage device. This process may be that the first terminal device manages the first file in the first terminal device based on the identification information included in the first metadata in response to a management operation performed by the user on the first file, and sends a corresponding operation instruction for the first file to the local storage device, where the operation instruction is used by the local storage device to manage the first file stored in the local storage device. In this way, inconsistency of a plurality of copies of the first file can be avoided, and management accuracy of a same file is improved.

In this embodiment of this application, the second application may be understood as a front-end application of the local storage device, and is used to bind, configure, and manage a home storage device, or may be used for data viewing and managing of home storage.

In this embodiment of this application, the local storage device may store a plurality of registered accounts, and each registered account may be associated with a plurality of terminal devices. Data synchronization may be performed between terminal devices associated under a same registered account via the local storage device. A device under a different registered account cannot access a file under another registered account. If a public storage area is set on the local storage device, for a file in the public storage area, a terminal device under each registered account can access or perform another management operation.

With reference to the accompanying drawings, the following describes the local storage device and a process of data synchronization between the plurality of terminal devices under the same registered account.

Figure 6A:
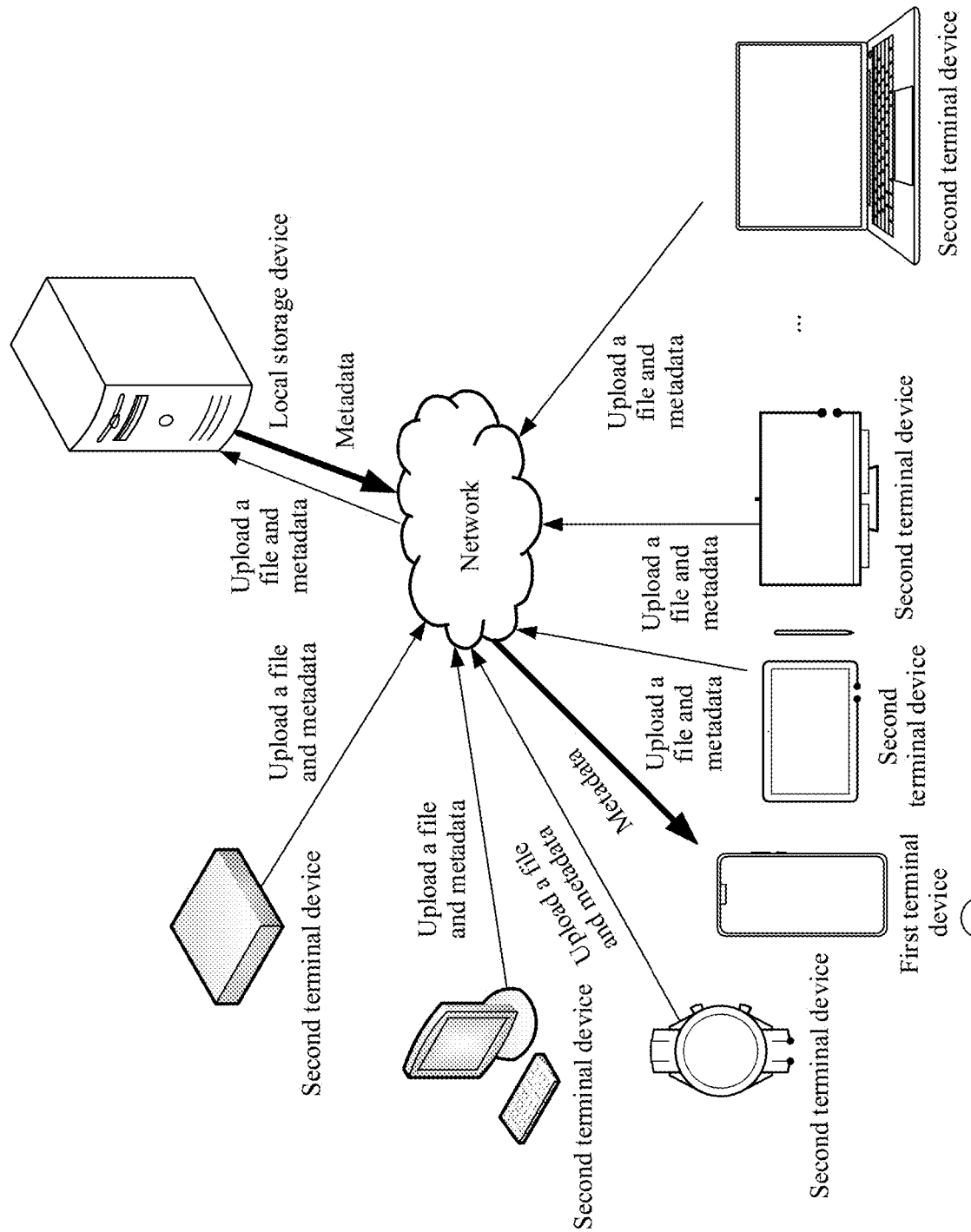
FIG. 6A is a diagram of another embodiment of a data management method according to an embodiment of this application.

As shown in FIG. 6A, a downlink data synchronization process for the first terminal device includes: One or more second terminal devices upload a file and metadata of the file to the local storage device over a network. The file may be a file newly generated by a corresponding second terminal device. The local storage device sends, in real time or periodically, metadata of a changed file to the first terminal device, where the changed file in the local storage device includes at least one of the following: a file newly generated by the second terminal device, a file that is in the local storage device and that is modified by the second terminal device, or a file that is in the local storage device and that is deleted by the second terminal device. The first terminal device may synchronously update, based on the metadata of the changed file and a change indication, metadata stored in the first terminal device.

It should be noted that the local storage device may send the metadata of the changed file to the first terminal device for a plurality of times through a plurality of pieces of signaling, and may provide a change indication in corresponding signaling. For example, the local storage device sends metadata of the newly generated file through insert signaling, sends metadata of the file that is in the local storage device and that is modified by the second terminal device through update signaling, and sends metadata of the file that is in the local storage device and that is deleted by the second terminal device through delete signaling. In this way, after receiving the corresponding signaling and metadata, the first terminal device may perform corresponding update, for example, add the metadata of the newly generated file to a corresponding metadata queue, update the modified metadata to a location of original old metadata, and delete the metadata that needs to be deleted from the metadata queue.

In this embodiment of this application, for a file generated or a file modified by another terminal under a same registered account, after the file is synchronized to the local storage device, the local storage device may synchronize corresponding metadata to the first terminal device, so that data synchronization between terminal devices under the same registered account can be maintained.

Figure 6B:
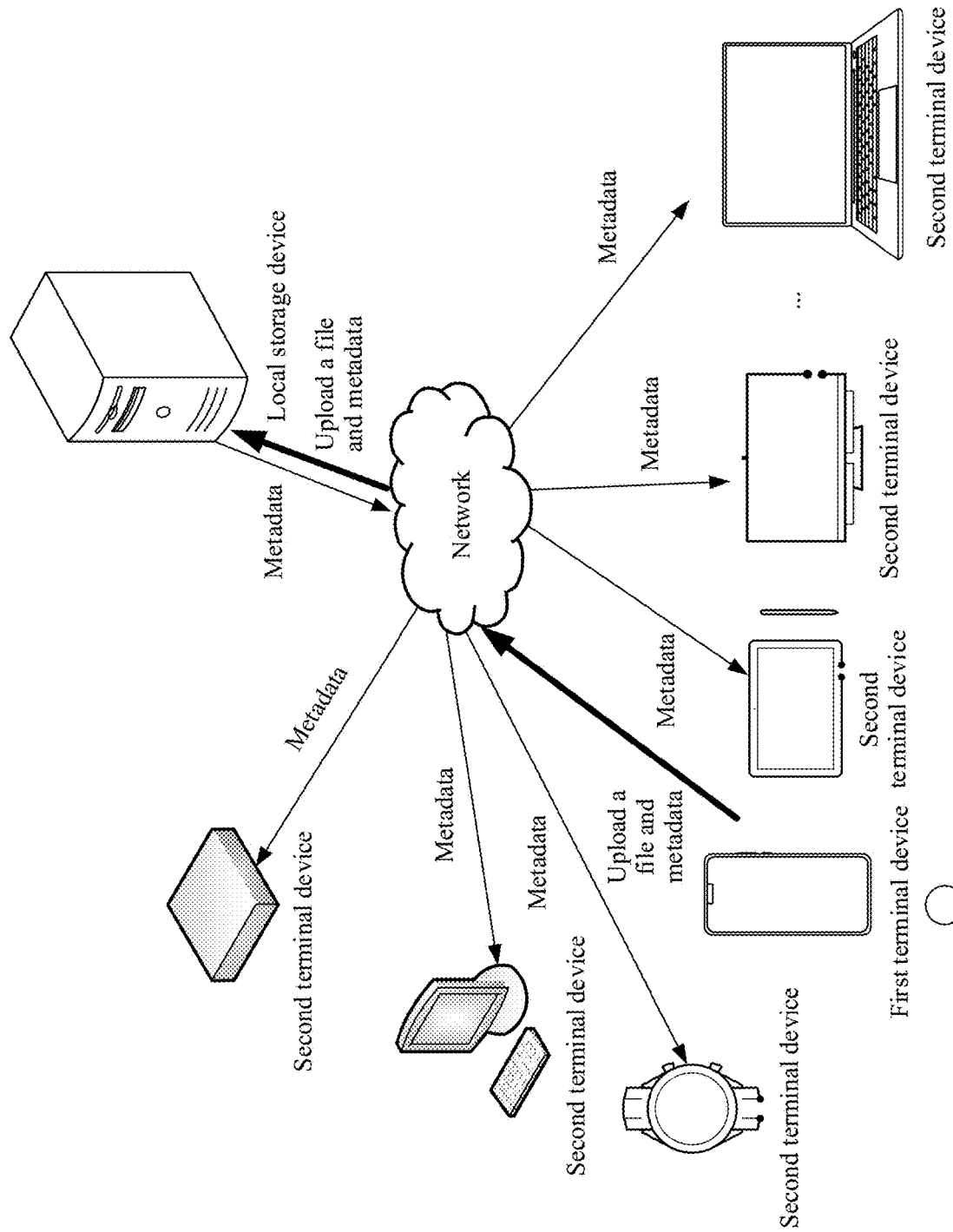
FIG. 6B is a diagram of another embodiment of a data management method according to an embodiment of this application.

As shown in FIG. 6B, an uplink data synchronization process for the first terminal device includes: The first terminal device sends changed data in the first terminal device to the local storage device, where the changed data in the first terminal device includes at least one of the following: metadata of a file newly generated by the first terminal device and the newly generated file, metadata of a file that is in the local storage device and that is modified by the first terminal device and a modified file, or metadata of a file that is in the local storage device and that is deleted by the first terminal device. The changed file is used by the local storage device to synchronously update the file and/or metadata stored in the local storage device.

After receiving the changed data that is in the first terminal device and that is sent by the first terminal device, the local storage device may synchronize corresponding metadata to another second terminal device based on the foregoing process of synchronizing the metadata to the first terminal device in FIG. 6A, so that data of terminal devices under the same registered account is synchronized.

Figure 7A:
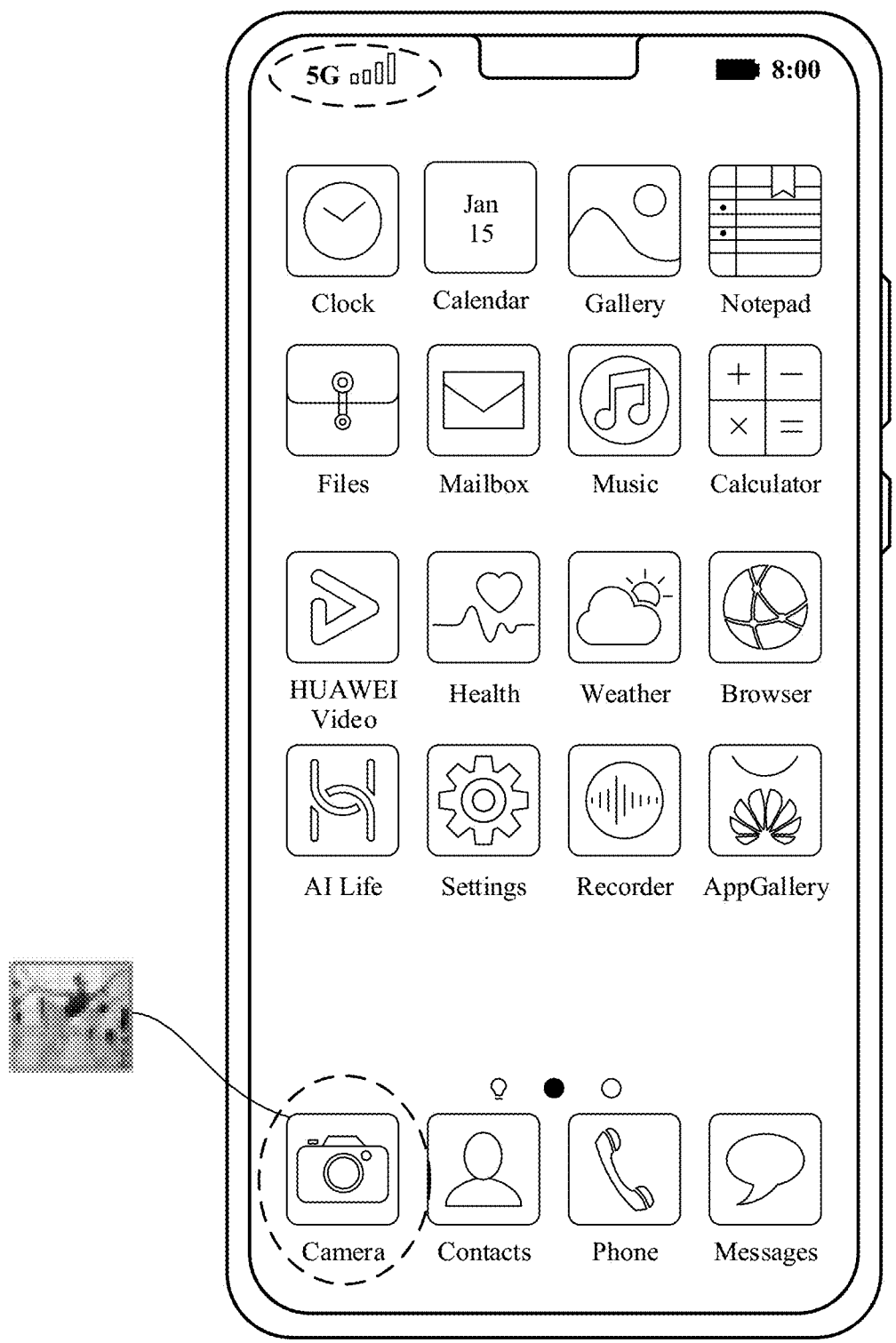
FIG. 7A is a diagram of an example of a scenario according to an embodiment of this application.
Figures 1, 7B:
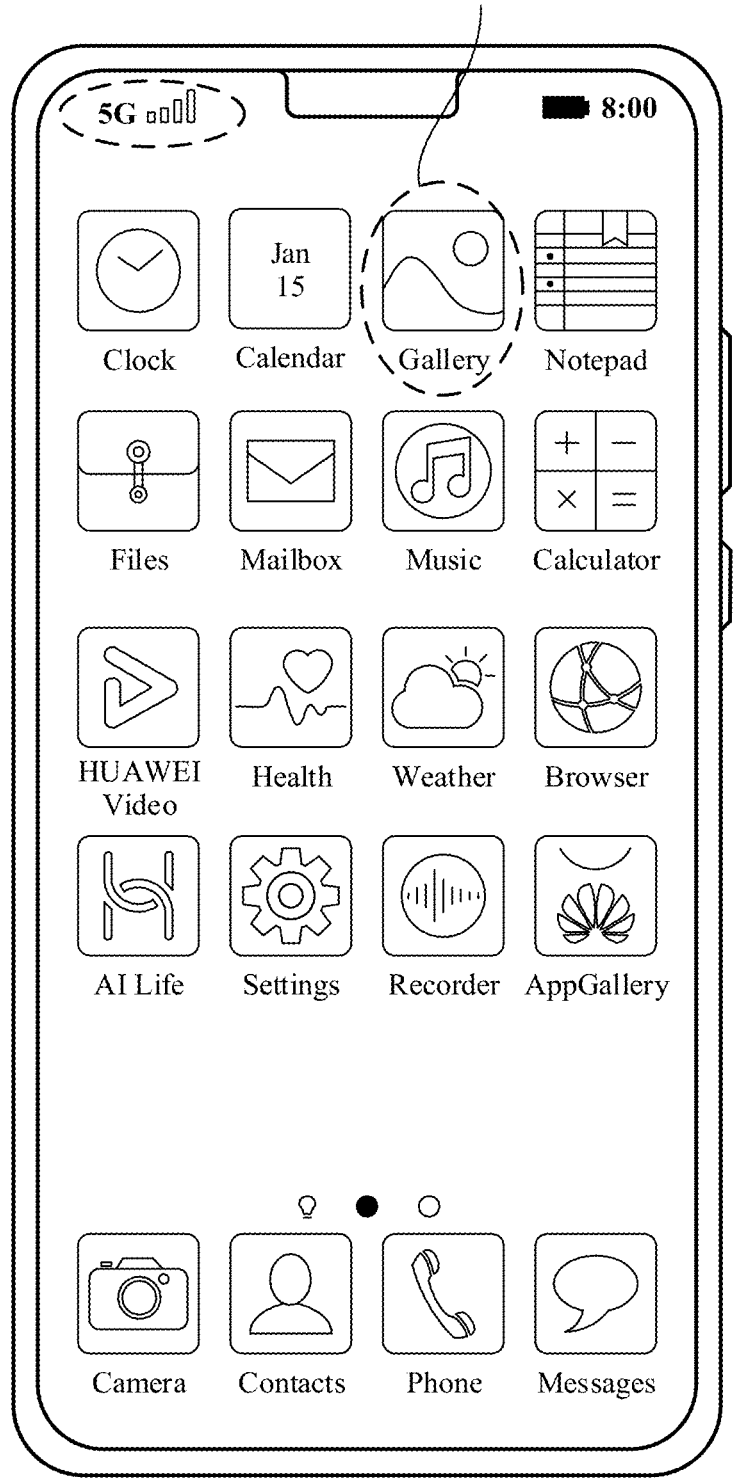
FIG. 7B-1 and FIG. 7B-2 are another diagram of an example of a scenario according to an embodiment of this application.
Figures 2, 7B:
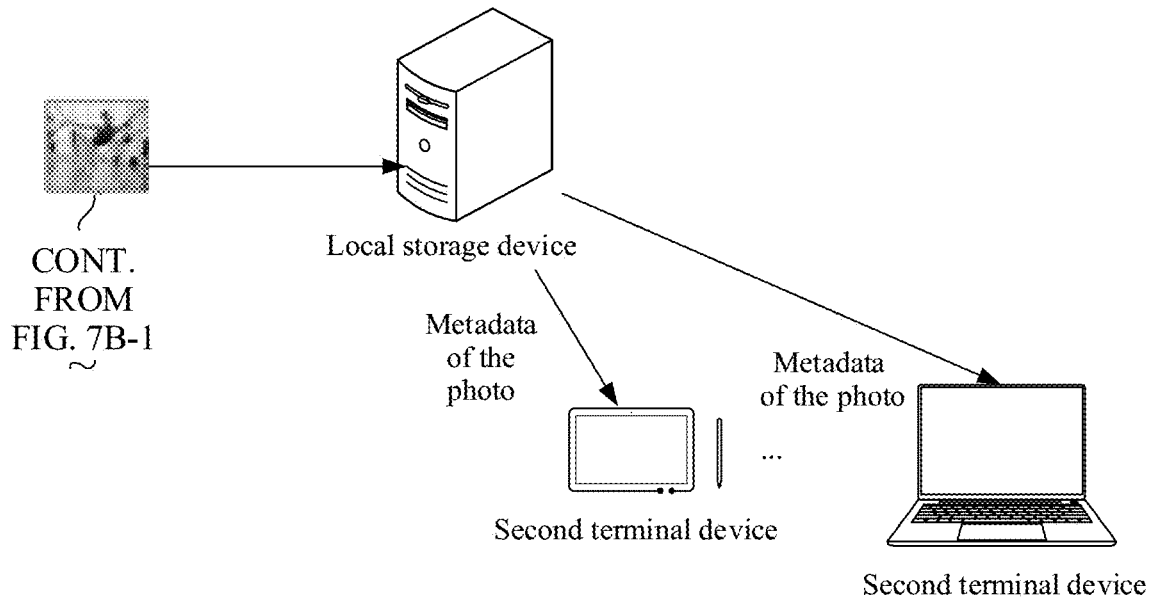

To better understand the foregoing data synchronization process, in this embodiment of this application, an example in which the first terminal device is a mobile phone and the first application is a gallery is used for description. As shown in FIG. 7A, a user uses a camera to take a photo, the photo is a newly generated file, and the photo is stored in the gallery. If the user operates the gallery as shown in FIG. 7B-1 and FIG. 7B-2, and needs to upload the photo to the local storage device, the mobile phone sends the photo and metadata of the photo to the local storage device through an insert instruction. After receiving the insert instruction, the local storage device stores the photo, and inserts the metadata of the photo into a metadata queue.

When performing downlink synchronization, the local storage device sends the metadata of the photo to another terminal device in a downlink synchronization process. In this way, the another terminal device can access or modify the photo.

Figure 7C:
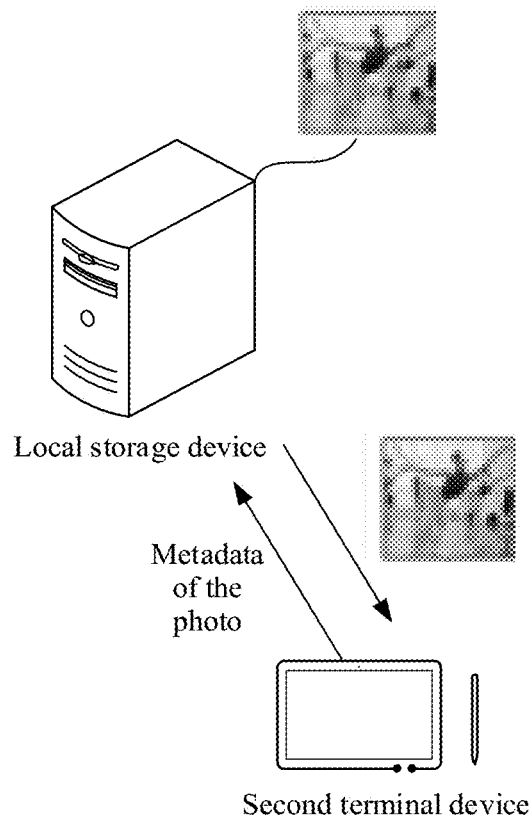
FIG. 7C is another diagram of an example of a scenario according to an embodiment of this application.

As shown in FIG. 7C, if the user wants to access the photo through an "instant messaging application A" on a tablet computer, the user may invoke an application invoking interface through the "instant messaging application A", to perform the process described in FIG. 5. Modules cooperate with each other to download the photo to the tablet computer.

In this embodiment of this application, during downlink data synchronization, only metadata or some thumbnail information is usually synchronized. However, during uplink synchronization, a file is usually uploaded. Therefore, time consumption of downlink synchronization is low, and downlink synchronization is usually performed before uplink synchronization. In this way, after downlink synchronization, the user can view and browse the file in the local storage device a timely manner. In addition, during downlink synchronization, the first terminal device may manage the metadata of the file in the local storage device and the metadata of the local file of the first terminal device. If it is determined that a file to be uploaded by the first terminal device has been uploaded to the local storage device via another terminal device, the first terminal device does not need to upload the file, thereby avoiding repeated uploading and saving network overheads.

Downlink synchronization is further classified into full synchronization and incremental synchronization. Full synchronization is triggered only when the user enables a synchronization switch of the first terminal device and the local storage device for the first time, that is, all metadata is downloaded from the local storage device to the first terminal device locally. Then, incremental synchronization is performed, that is, only metadata of a changed file that is newly generated is downloaded since last synchronization to the current time.

The local storage device generally manages, such as modifies or deletes according to a management instruction that occurs later, files uploaded by different terminal devices or files that have been stored. For example, the user sends a modification instruction to the local storage device via the first terminal device at an earlier time point, to modify a file, and sends a deletion instruction to the local storage device via the second terminal device at a later time point, to delete the file. However, both the first terminal device and the second terminal device send the corresponding instructions to the local storage device during timing synchronization, so that the local storage device deletes the file according to the deletion instruction at the later time point.

In this embodiment of this application, in the foregoing data synchronization process, data is transferred between the terminal devices, and convergence between the local storage device and the terminal device is implemented. The local storage device is really referred to as storage extension of the terminal device. The user accesses the file in the local storage device as accessing the local file in the terminal device.

It can be learned from the foregoing synchronization process that, in the solution of this application, new addition at one end is visible to a plurality of ends, and modification at one end is synchronized to a plurality of ends. In addition, through data synchronization, all files in the terminal device may be backed up to the local storage device, and even if the terminal device is faulty or lost, the files in the terminal device are not lost.

In addition, in this embodiment of this application, the first terminal device may delete a second file from the local file of the first terminal device in response to a delete operation performed by the user on the second file, where the second file has already been stored in the local storage device. In this way, the file that has been stored in the local storage device is deleted from the local file, to release local storage space, and experience of accessing the file by the user through the first application is not affected.

In this embodiment of this application, after purchasing the local storage device, the user may establish a contact between the terminal device and the local storage device by downloading a second application dedicated to the local storage device.

Figure 8:
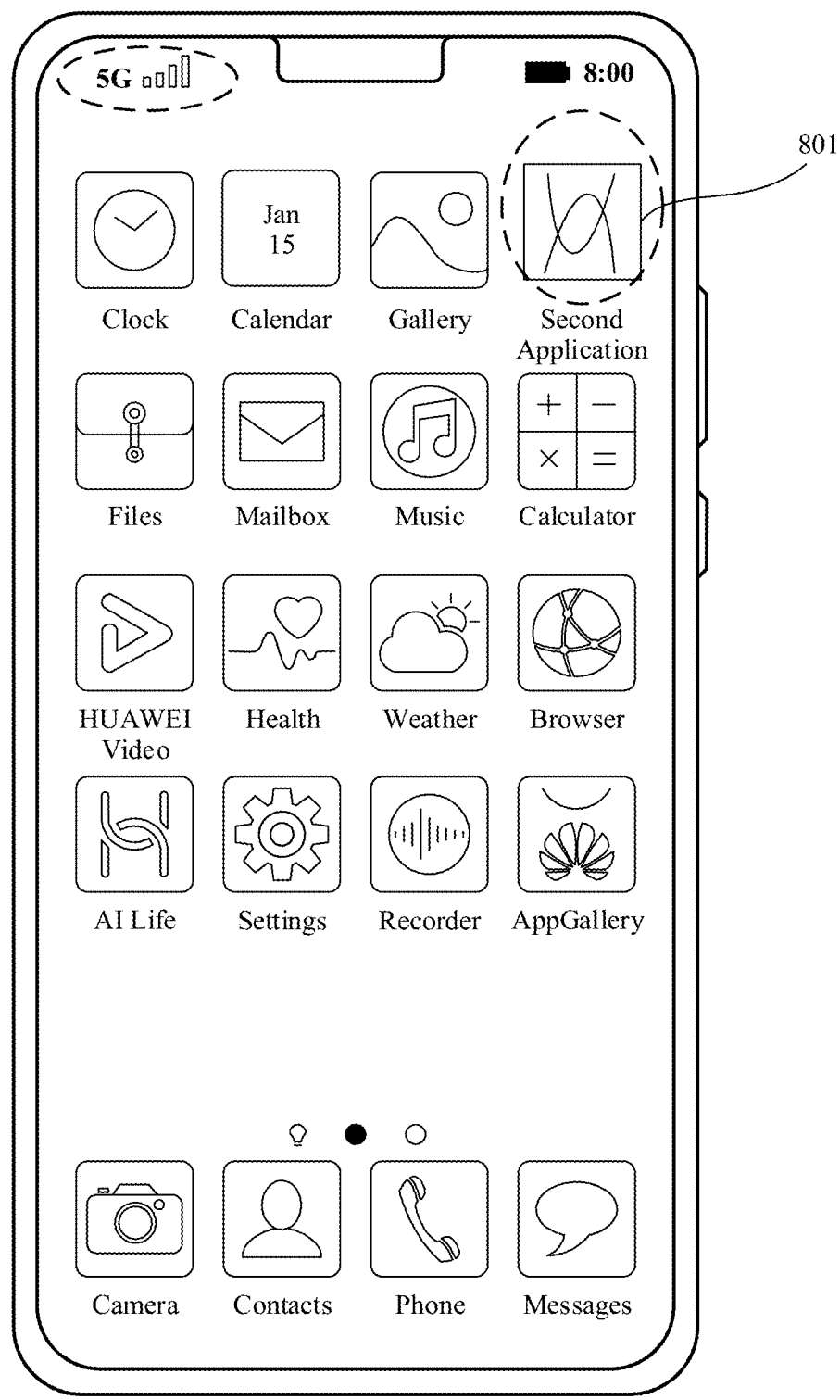
FIG. 8 is an interface diagram of a terminal device according to an embodiment of this application.

As shown in FIG. 8, an icon 801 is an entry of the second application, and the contact between the terminal device and the local storage device may be established through the second application.

The following describes a working process between the local storage device and the terminal device from starting of the local storage device.

Figure 9A:
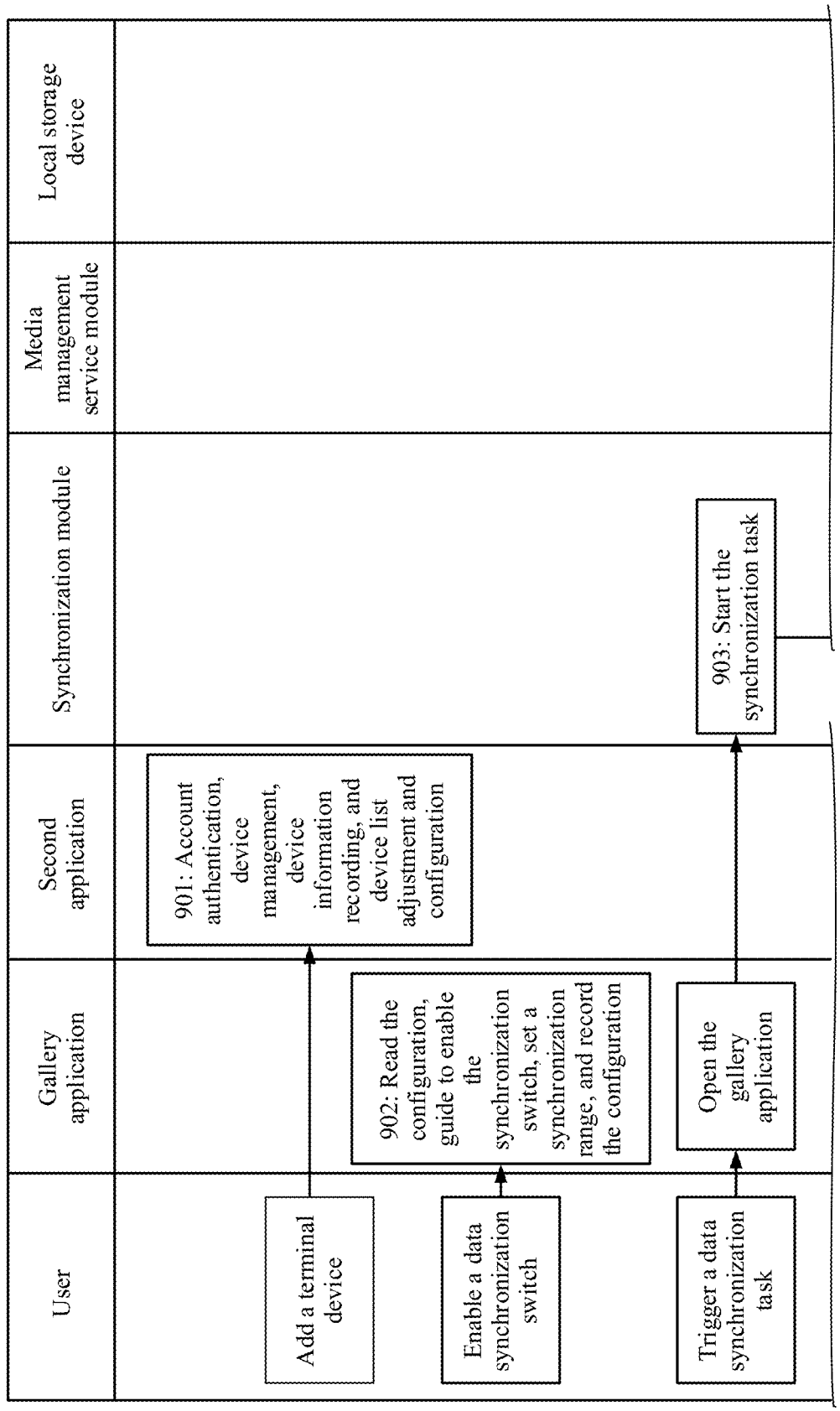
FIG. 9A, FIG. 9B, and FIG. 9C are a diagram of another embodiment of a data management method according to an embodiment of this application.
Figure 9B:
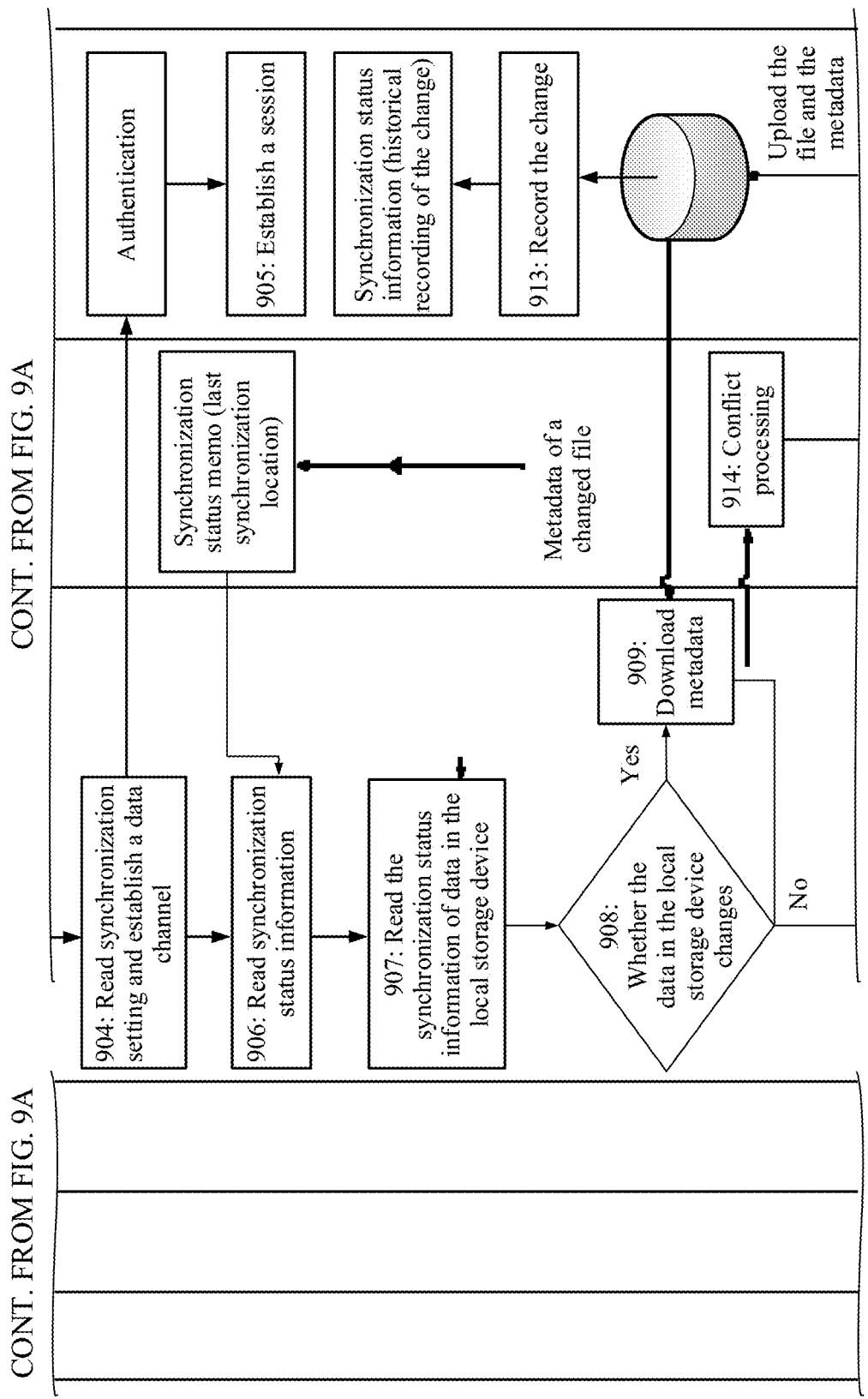
Figure 9C:
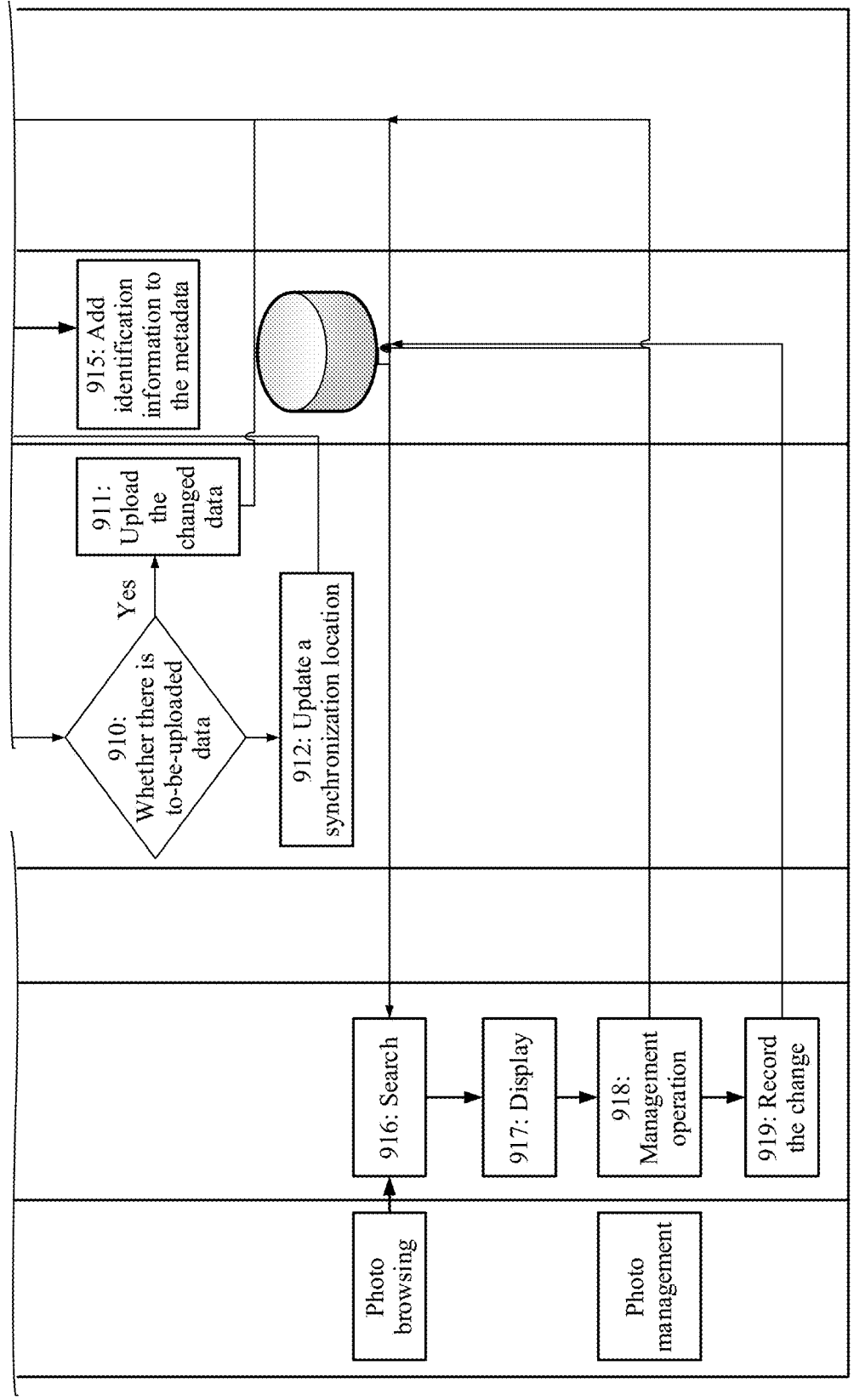

An example in which the first application is a "gallery" application is used for description. As shown in FIG. 9A, FIG. 9B, and FIG. 9C, a data management process provided in this embodiment of this application includes the following steps.

901: A terminal device establishes an association between the terminal device and a local storage device in response to an operation, for example, account authentication, device association, device information recording, and device list adjustment and configuration, performed by a user through a second application.

This process may also be understood as a process in which the user adds the terminal device to the local storage device.

902: The terminal device reads the configuration, guides to enable a synchronization switch, sets a synchronization range, and records the configuration through the gallery application in response to the user operation.

The process may be understood as a process in which the user enables the data synchronization switch.

903: The terminal device opens the gallery and starts a synchronization process in response to an operation of triggering a data synchronization task by the user.

904: A synchronization module in the terminal device reads synchronization setting, establishes a data channel, and sends an authentication request to the local storage device.

905: The local storage device establishes a session.

In other words, a process of establishing the data channel between the local storage device and the synchronization module of the terminal device is completed.

906: The synchronization module in the terminal device reads synchronization status information from a synchronization status memo of a media management service module.

The media management service module in this embodiment of this application may include the metadata management module in FIG. 5.

907: The synchronization module in the terminal device reads the synchronization status information of data in the local storage device.

908: The synchronization module determines whether the data in the local storage device changes. If yes, step 909 is performed, or if no, step 910 is performed.

909: If the data in the local storage device changes, the synchronization module downloads metadata of a changed file in the local storage device to the terminal device.

910: If the data in the local storage device does not change, whether there is to-be-uploaded data in the terminal device is determined. If yes, step 911 is performed, or if no, step 912 is performed.

911: Upload the changed file and metadata in the terminal device to the local storage device.

912: Update a synchronization location in the synchronization status memo, and then end the synchronization process.

913: After receiving the file and the metadata, the local storage device updates the synchronization status information of the data in the local storage device.

914: After step 909, the media management service module in the terminal device may further perform conflict processing.

The conflict processing means that the metadata of the downloaded file is already in the terminal device. In this case, the terminal device does not need to upload the file again.

915: The media management service in the terminal device may add identification information to the metadata management module for the metadata of the file, to indicate that the file is in both the terminal device and the local storage device.

916: The terminal device obtains metadata of a target picture in response to a picture search operation performed by the user in the gallery application.

917: The terminal device obtains the target picture from the local storage device or the local file, and displays the target picture.

918: The terminal device responds to a management operation performed by the user on the target picture in the gallery application.

919: The terminal device records the change, and manages the target picture via the media management service module.

If some applications have no permission to modify or delete the picture in the gallery, and have only an access permission, the process may be understood with reference to 917 and 918.

The foregoing describes the data management method and system. The following describes a terminal device and a local storage device in embodiments of this application with reference to the accompanying drawings. The terminal device may be understood as the first terminal device in the foregoing method embodiment.

Figure 10:
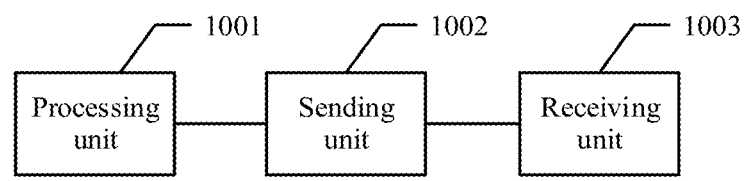
FIG. 10 is a diagram of another structure of a terminal device according to an embodiment of this application.

As shown in FIG. 10, an embodiment of a terminal device provided in an embodiment of this application includes the following units.

A processing unit 1001 is configured to obtain metadata of a target file in response to an access operation performed by a user on the target file through a first application, where the target file is stored in a local storage device, the first application is different from a second application, the second application is a dedicated application that is of the local storage device and that is installed on the first terminal device, and the first terminal device stores the metadata of the file stored in the local storage device. The processing unit 1001 is configured to perform step 301 in the foregoing method embodiment.

A sending unit 1002 is configured to send an access request to the local storage device, where the access request includes the metadata. The sending unit 1002 is configured to perform step 302 in the foregoing method embodiment.

A receiving unit 1003 is configured to receive the target file sent by the local storage device. The receiving unit 1003 is configured to perform step 303 in the foregoing method embodiment.

In this embodiment of this application, because the first terminal device stores the metadata of the file stored in the local storage device, when the user needs to search, through the first application, for the target file stored in the local storage device, the first terminal device may search for the target file from the local storage device based on the metadata of the target file, and may query the file in the local storage device without using the second application dedicated to the local storage device, thereby improving flexibility of using the local storage device.

Optionally, the first terminal device includes an application layer, a framework service layer, and a storage layer. The first application and the second application are configured at the application layer. A distributed file is configured at the storage layer, and the distributed file provides the application layer with a capability of accessing the local storage device. An application invoking interface, a metadata management module, and a synchronization module are configured at the framework service layer. The application invoking interface is an entry for the first application to enter the framework service layer, and is configured to invoke the metadata management module. The metadata management module is configured to manage the metadata of the file stored in the local storage device. The synchronization module is logically connected to the distributed file and performs file transfer with the local storage device.

Optionally, a local file is further configured at the storage layer, and the local file stores a file generated by the first terminal device. The metadata management module is further configured to manage metadata of the file stored in the local file.

Optionally, the framework service layer includes a file buffer, and the file buffer is configured to buffer the target file or thumbnail information of the target file within a preset time period starting from a generation time of the target file.

Optionally, first metadata in the metadata management module includes identification information, the first metadata is metadata of a first file, and the identification information indicates that the first file is stored in both the first terminal device and the local storage device.

Optionally, the processing unit 1001 is further configured to manage the first file in the first terminal device based on the identification information included in the first metadata in response to a management operation performed by the user on the first file.

Optionally, the sending unit 1002 is further configured to send a corresponding operation instruction for the first file to the local storage device, where the operation instruction is used by the local storage device to manage the first file stored in the local storage device.

Optionally, the receiving unit 1003 is further configured to receive metadata of a changed file in the local storage device from the local storage device, where the changed file in the local storage device includes at least one of the following: a file newly generated by a second terminal device, a file that is in the local storage device and that is modified by the second terminal device, or a file that is in the local storage device and that is deleted by the second terminal device, and the second terminal device and the first terminal device are associated with a same registered account in the local storage device. The first terminal device synchronously updates, based on the metadata of the changed file and a change indication, metadata stored in the first terminal device.

Optionally, the sending unit 1002 is further configured to send changed data in the first terminal device to the local storage device, where the changed data in the first terminal device includes at least one of the following: metadata of a file newly generated by the first terminal device and the newly generated file, metadata of a file that is in the local storage device and that is modified by the first terminal device and a modified file, or metadata of a file that is in the local storage device and that is deleted by the first terminal device. The changed file is used by the local storage device to synchronously update the file and/or metadata stored in the local storage device.

Optionally, the processing unit 1001 is further configured to delete a second file from the local file of the first terminal device in response to a delete operation performed by the user on the second file, where the second file has already been stored in the local storage device.

Optionally, the receiving unit 1003 is further configured to receive an analysis result from the local storage device, where the analysis result is obtained by the local storage device by analyzing the file in the local storage device.

For functions of the modules in the terminal device described above, refer to the steps performed by the first terminal device in the foregoing method embodiment for understanding.

Figure 11:
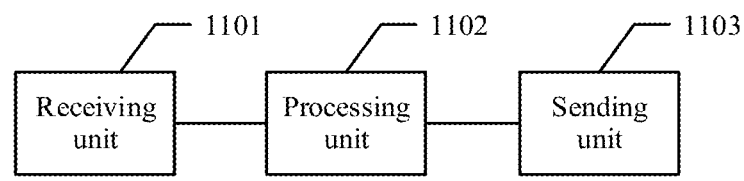
FIG. 11 is a diagram of another structure of a local storage device according to an embodiment of this application.

As shown in FIG. 11, an embodiment of a local storage device provided in an embodiment of this application includes the following units.

A receiving unit 1101 is configured to receive an access request sent by a first terminal device, where the access request is triggered by the first terminal device in response to an access operation performed by a user on a target file through a first application, the target file is stored in the local storage device, the first application is different from a second application, the second application is a dedicated application that is of the local storage device and that is installed on the first terminal device, and the access request includes metadata of the target file.

A processing unit 1102 is configured to search for the target file based on the access request and the metadata.

A sending unit 1103 is configured to send the target file to the first terminal device.

Optionally, the sending unit 1103 is further configured to send metadata of a changed file in the local storage device to the first terminal device, where the changed file in the local storage device includes at least one of the following: a file newly generated by a second terminal device, a file that is in the local storage device and that is modified by the second terminal device, or a file that is in the local storage device and that is deleted by the second terminal device, and the second terminal device and the first terminal device are associated with a same registered account in the local storage device.

Optionally, the receiving unit 1101 is further configured to receive changed data that is in the first terminal device and that is sent by the first terminal device, where the changed data in the first terminal device includes at least one of the following: metadata of a file newly generated by the first terminal device and the newly generated file, metadata of a file that is in the local storage device and that is modified by the first terminal device and a modified file, or metadata of a file that is in the local storage device and that is deleted by the first terminal device. The local storage device synchronously updates, based on the changed file, the file and/or metadata stored in the local storage device.

Optionally, the processing unit 1102 is further configured to analyze the file in the local storage device to obtain an analysis result.

The sending unit 1103 is further configured to send the analysis result to the first terminal device.

For functions of the modules in the local storage device described above, refer to the steps performed by the local storage device in the foregoing method embodiment for understanding.

It should be noted that the sending unit 1002 and the receiving unit 1003 of the terminal device may be implemented via a transceiver. The receiving unit 1101 and the sending unit 1103 in the local storage device may be implemented through a communication interface.

In another embodiment of this application, a computer-readable storage medium is further provided. The computer-readable storage medium stores computer-executable instructions. When a processor of a terminal executes the computer-executable instructions, the terminal device performs the steps performed by the terminal device in FIG. 1A to FIG. 9A, FIG. 9B, and FIG. 9C.

In another embodiment of this application, a computer-readable storage medium is further provided. The computer-readable storage medium stores computer-executable instructions. When a processor of a terminal executes the computer-executable instructions, a cloud device performs the steps performed by the local storage device in FIG. 1A to FIG. 9A, FIG. 9B, and FIG. 9C.

In another embodiment of this application, a computer program product is further provided. The computer program product includes computer program code. When the computer program code is executed on a computer, a computer device performs the steps performed by the terminal device in FIG. 1A to FIG. 9A, FIG. 9B, and FIG. 9C.

In another embodiment of this application, a computer program product is further provided. The computer program product includes computer program code. When the computer program code is executed on a computer, a computer device performs the steps performed by the local storage device in FIG. 1A to FIG. 9A, FIG. 9B, and FIG. 9C.

In another embodiment of this application, a chip system is further provided. The chip system includes one or more interface circuits and one or more processors. The interface circuit and the processor are interconnected through a line. The interface circuit is configured to receive a signal from a memory of a terminal device, and send the signal to the processor. The signal includes computer instructions stored in the memory. When the processor executes the computer instructions, the terminal device performs the steps performed by the first terminal device in FIG. 1A to FIG. 9A, FIG. 9B, and FIG. 9C. In a possible design, the chip system further includes a memory. The memory is configured to store program instructions and data that are necessary for the control device. The chip system may include a chip, or may include the chip and another discrete component.

In another embodiment of this application, a chip system is further provided. The chip system includes one or more interface circuits and one or more processors. The interface circuit and the processor are interconnected through a line. The interface circuit is configured to receive a signal from a memory of a local storage device, and send the signal to the processor. The signal includes computer instructions stored in the memory. When the processor executes the computer instructions, the steps performed by the local storage device in FIG. 1A to FIG. 9A, FIG. 9B, and FIG. 9C are performed. In a possible design, the chip system further includes a memory. The memory is configured to store program instructions and data that are necessary for the control device. The chip system may include a chip, or may include the chip and another discrete component.

In the several embodiments provided in this application, it should be understood that the disclosed system, apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. All or some of the foregoing integrated units may be implemented by using software, hardware, firmware, or any combination thereof.

When the integrated unit is implemented by using software, all or a part of embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The invention claimed is:

1. A data management method, comprising:
    obtaining, by a first terminal device, metadata of a target file in response to an access operation performed by a user on the target file through a first application, wherein the target file is stored in a local storage device, the first application is different from a second application, the second application is a dedicated application that is of the local storage device and that is installed on the first terminal device, and the first terminal device stores the metadata of the target file;
    sending, by the first terminal device, an access request to the local storage device, wherein the access request comprises the metadata of the target file;
    receiving, by the first terminal device, the target file sent by the local storage device;
    receiving, by the first terminal device, metadata of a changed file in the local storage device from the local storage device,
    wherein the changed file in the local storage device comprises at least one of the following: a file newly generated by a second terminal device, a file that is in the local storage device and that is modified by the second terminal device, or a file that is in the local storage device and that is deleted by the second terminal device; and
    synchronously updating, by the first terminal device based on the metadata of the changed file and a change indication, metadata stored in the first terminal device, wherein the second terminal device and the first terminal device are associated with a same registered account in the local storage device.

2. The method according to claim 1, wherein:
    the first terminal device comprises an application layer, a framework service layer, and a storage layer;
    the first application and the second application are configured at the application layer;
    a distributed file is configured at the storage layer, and the distributed file provides the application layer with a capability of accessing the local storage device; and
    an application invoking interface, a metadata manager, and a synchronizer are configured at the framework service layer, wherein the application invoking interface is an entry for the first application to enter the framework service layer, and is configured to invoke the metadata manager, wherein the metadata manager is configured to manage the metadata of the target file, and wherein the synchronizer is logically connected to the distributed file and performs file transfer with the local storage device.

3. The method according to claim 2, wherein:
    a local file is further configured at the storage layer, and the local file stores a file generated by the first terminal device; and
    the metadata manager is further configured to manage metadata of the file stored in the local file.

4. The method according to claim 2, wherein the framework service layer comprises a file buffer, and the file buffer is configured to buffer the target file or thumbnail information of the target file within a preset time period starting from a generation time of the target file.

5. The method according to claim 2, wherein first metadata in the metadata manager comprises identification information, the first metadata is metadata of a first file, and the identification information indicates that the first file is stored in both the first terminal device and the local storage device.

6. The method according to claim 5, wherein the method further comprises:
    managing, by the first terminal device, the first file in the first terminal device based on the identification information comprised in the first metadata in response to a management operation performed by the user on the first file, and sending a corresponding operation instruction for the first file to the local storage device, wherein the operation instruction is used by the local storage device to manage the first file stored in the local storage device.

7. The method according to claim 1, wherein the method further comprises:
    sending, by the first terminal device, changed data in the first terminal device to the local storage device, wherein the changed data in the first terminal device comprises at least one of the following: metadata of a file newly generated by the first terminal device and the newly generated file, metadata of a file that is in the local storage device and that is modified by the first terminal device and a modified file, or metadata of a file that is in the local storage device and that is deleted by the first terminal device, wherein the changed data is used by the local storage device to synchronously update at least one of the file or metadata stored in the local storage device.

8. The method according to claim 7, wherein the method further comprises:
deleting, by the first terminal device, a second file from a local file of the first terminal device in response to a delete operation performed by the user on the second file, wherein the second file has already been stored in the local storage device.

9. The method according to claim 1, wherein the method further comprises:
receiving, by the first terminal device, an analysis result from the local storage device, wherein the analysis result is obtained by the local storage device by analyzing the target file in the local storage device.

10. The method according to claim 1, wherein the first application is an album management application, a file management application, or a third-party application.

11. A data management method, comprising:
receiving, by a local storage device, an access request sent by a first terminal device, wherein the access request is triggered by the first terminal device in response to an access operation performed by a user on a target file through a first application, the target file is stored in the local storage device, the first application is different from a second application, the second application is a dedicated application that is of the local storage device and that is installed on the first terminal device, and the access request comprises metadata of the target file;
searching for, by the local storage device, the target file based on the access request and the metadata of the target file;
sending, by the local storage device, the target file to the first terminal device; and
sending, by the local storage device, metadata of a changed file in the local storage device to the first terminal device, wherein the changed file in the local storage device comprises at least one of the following: a file newly generated by a second terminal device, a file that is in the local storage device and that is modified by the second terminal device, or a file that is in the local storage device and that is deleted by the second terminal device; and
wherein the second terminal device and the first terminal device are associated with a same registered account in the local storage device.

12. The method according to claim 11, wherein the method further comprises:
receiving, by the local storage device, changed data that is in the first terminal device and that is sent by the first terminal device, wherein the changed data in the first terminal device comprises at least one of the following: metadata of a file newly generated by the first terminal device and the newly generated file, metadata of a file that is in the local storage device and that is modified by the first terminal device and a modified file, or metadata of a file that is in the local storage device and that is deleted by the first terminal device; and
synchronously updating, by the local storage device based on the changed data, at least one of the file or metadata stored in the local storage device.

13. The method according to claim 11, wherein the method further comprises:
analyzing, by the local storage device, the target file in the local storage device to obtain an analysis result; and
sending, by the local storage device, the analysis result to the first terminal device.

14. A terminal device, comprising:
a transceiver;
at least one processor; and
one or more memories coupled to the at least one processor and storing programming instructions for execution by the at least one processor to perform operations comprising:
obtaining metadata of a target file in response to an access operation performed by a user on the target file through a first application, wherein the target file is stored in a local storage device, the first application is different from a second application, the second application is a dedicated application that is of the local storage device and that is installed on the terminal device, and the terminal device stores the metadata of the target file;
sending an access request to the local storage device, wherein the access request comprises the metadata of the target file;
receiving the target file sent by the local storage device;
receiving metadata of a changed file in the local storage device from the local storage device, wherein the changed file in the local storage device comprises at least one of the following: a file newly generated by a second terminal device, a file that is in the local storage device and that is modified by the second terminal device, or a file that is in the local storage device and that is deleted by the second terminal device; and
synchronously updating, based on the metadata of the changed file and a change indication, metadata stored in the terminal device, wherein the second terminal device and the terminal device are associated with a same registered account in the local storage device.

15. The terminal device according to claim 14, wherein:
the terminal device comprises an application layer, a framework service layer, and a storage layer;
the first application and the second application are configured at the application layer;
a distributed file is configured at the storage layer, and the distributed file provides the application layer with a capability of accessing the local storage device; and
an application invoking interface, a metadata manager, and a synchronizer are configured at the framework service layer, wherein the application invoking interface is an entry for the first application to enter the framework service layer, and is configured to invoke the metadata manager, wherein the metadata manager is configured to manage the metadata of the target file stored in the local storage device, and wherein the synchronizer is logically connected to the distributed file and performs file transfer with the local storage device.

16. The terminal device according to claim 15, wherein:
a local file is further configured at the storage layer, and the local file stores a file generated by the terminal device; and the metadata manager is further configured to manage metadata of the file stored in the local file.

17. The terminal device according to claim 15, wherein the framework service layer comprises a file buffer, and the file buffer is configured to buffer the target file or thumbnail information of the target file within a preset time period starting from a generation time of the target file.

18. The terminal device according to claim 15, wherein first metadata in the metadata manager comprises identification information, the first metadata is metadata of a first file, and the identification information indicates that the first file is stored in both the terminal device and the local storage device.

* * * * *